US012643786B2

(12) United States Patent     (10) Patent No.:   US 12,643,786 B2

Bergamini et al.     (45) Date of Patent:     Jun. 2, 2026

(54) METHOD TO CONTROL A DISPENSING MACHINE OF FLUID PRODUCTS

(71) Applicants:COROB S.P.A, San Felice sul Panaro (IT); PPG INDUSTRIES OHIO, INC., Cleveland, OH (US)

(72) Inventors: Andrea Bergamini, Nonantola (IT); Vittorio Mercurio, Modena (IT); Giuseppe Casalini, Canegrate (IT); Joanne Sarah Thompson, Acton (GB); Alban R. D'Epenoux, Morges (CH)

(73) Assignees: Corob S.P.A., San Felica sul Panaro (IT); PPG Industries Ohio, Inc., Cleveland, OH (US)

( * ) Notice: Subject to any disclaimer, the term of this patent is extended or adjusted under 35 U.S.C. 154(b) by 845 days.

(21) Appl. No.: 17/555,452

(22) Filed: Dec. 19, 2021

(65) Prior Publication Data

US 2022/0112072 A1     Apr. 14, 2022

Related U.S. Application Data

(63) Continuation of application No. PCT/IT2020/050151, filed on Jun. 16, 2020.

(30) Foreign Application Priority Data

Jun. 18, 2019    (IT) ........................ 102019000009267

(51) Int. Cl.
   B67D 7/22       (2010.01)
   B67D 7/02       (2010.01)
           (Continued)

(52) U.S. Cl.
   CPC .............. B67D 7/222 (2013.01); B67D 7/78 (2013.01); G05B 19/042 (2013.01); B67D 7/02 (2013.01); G05B 2219/2601 (2013.01)

(58) Field of Classification Search
None
See application file for complete search history.

(56) References Cited

U.S. PATENT DOCUMENTS

| 3,122,272 A | * | 2/1964 | Marsh | .................... | B44D 3/003 |
| | | | | | 222/26 |
| 4,258,759 A | * | 3/1981 | Achen | .................... | B44D 3/003 |
| | | | | | 141/129 |

(Continued)

FOREIGN PATENT DOCUMENTS

| DE | 202018105716 U1 | 9/2019 |
| EP | 0056170 A1 | 7/1982 |

(Continued)

OTHER PUBLICATIONS

International Search Report and Written Opinion in Parent Application, PCT/IT2020/050151, dated Sep. 14, 2020 (12 pages).

*Primary Examiner* — Paul R Durand
*Assistant Examiner* — Michael J. Melaragno
(74) *Attorney, Agent, or Firm* — Calderone McKay LLC

(57) ABSTRACT

Computer-implemented method to control a dispensing machine configured to deliver fluid products inside a receptacle (118) and comprising a plurality of containing units (111), each containing a respective fluid product, one or more storage zones (128) of the containing units (111) and a dispensing zone (115) wherein it is provided to temporarily and selectively locate at least one sub-assembly of containing units (111) containing the fluid products to be delivered in a dispensing cycle, making use of a computing device (161) comprising at least one processor (164), data storage means (162) with a formulation database, an input device (163), and a display device (159), wherein the control method comprises determining the disposition of the plurality of containing units (111) in the dispensing zone (115) and in the storage zone(s) (128), receiving, via the input (Continued)

device, a target formulation, selected by the user, and identifying, via the processor, from the formulation database an associated plurality of fluid products contained in respective containing units (111) of the sub-assembly, each to be delivered according to a predetermined quantity to obtain said target formulation. The computer-implemented control method also comprises displaying a graphic representation of the layout of the dispensing machine with the dispensing zone (15) and the storage zone(s) (28), which respectively reflects the disposition of the sub-assembly of containing units (111) disposed in the dispensing zone (115) and in the storage zone(s) (128), and graphically highlighting, in the graphic representation, at least the sub-assembly of containing units (11) from which the selected target formulation is to be produced by means of signaling means so as to facilitate their identification by the user and thus provide guidance to the user for displacing of one or more than one containing unit(s) (111) from the storage zone(s) (128) to the dispensing zone (115), or vice versa, if required for the production of the target formulation.

25 Claims, 13 Drawing Sheets

(51) Int. Cl.
B67D 7/78 (2010.01)
G05B 19/042 (2006.01)

(56) References Cited

U.S. PATENT DOCUMENTS

| | | | | |
|---|---|---|---|---|
| 5,078,302 | A * | 1/1992 | Hellenberg | B01F 35/7179 222/144.5 |
| 9,464,169 | B2 * | 10/2016 | Rukavina | C08G 18/758 |
| 9,994,670 | B2 * | 6/2018 | Rukavina | C08G 18/4018 |
| 2005/0092386 | A1 * | 5/2005 | Kaufhold | B01F 35/718051 141/83 |
| 2010/0318220 | A1 * | 12/2010 | Saranow | A45D 44/02 700/239 |
| 2011/0100504 | A1 * | 5/2011 | Saranow | B01F 33/848 141/83 |
| 2011/0290823 | A1 * | 12/2011 | Miller | B05B 15/58 239/113 |
| 2013/0032244 | A1 * | 2/2013 | Boboltz | B01F 33/846 141/83 |
| 2014/0199524 | A1 * | 7/2014 | Rukavina | C08G 18/44 428/221 |
| 2016/0039968 | A1 * | 2/2016 | Rukavina | C08G 18/725 428/221 |
| 2016/0333133 | A1 * | 11/2016 | Rukavina | B32B 17/10 |
| 2021/0086149 | A1 * | 3/2021 | Bergamini | B01F 35/712 |
| 2021/0130152 | A1 * | 5/2021 | Decker | B67D 3/0077 |
| 2022/0112072 | A1 * | 4/2022 | Bergamini | B01F 33/848 |
| 2022/0127132 | A1 * | 4/2022 | Bergamini | G06K 7/1413 |

FOREIGN PATENT DOCUMENTS

| | | |
|---|---|---|
| EP | 2585204 | 5/2013 |
| EP | 3466530 A1 | 4/2019 |
| ES | 8300496 A1 | 11/1982 |
| WO | WO 2011161532 A1 | 12/2011 |

* cited by examiner

65

66

Product code: 421

Product type: TINTER

Specific weight: 1005

Level: 455.015

Toner capacity: 500 cc

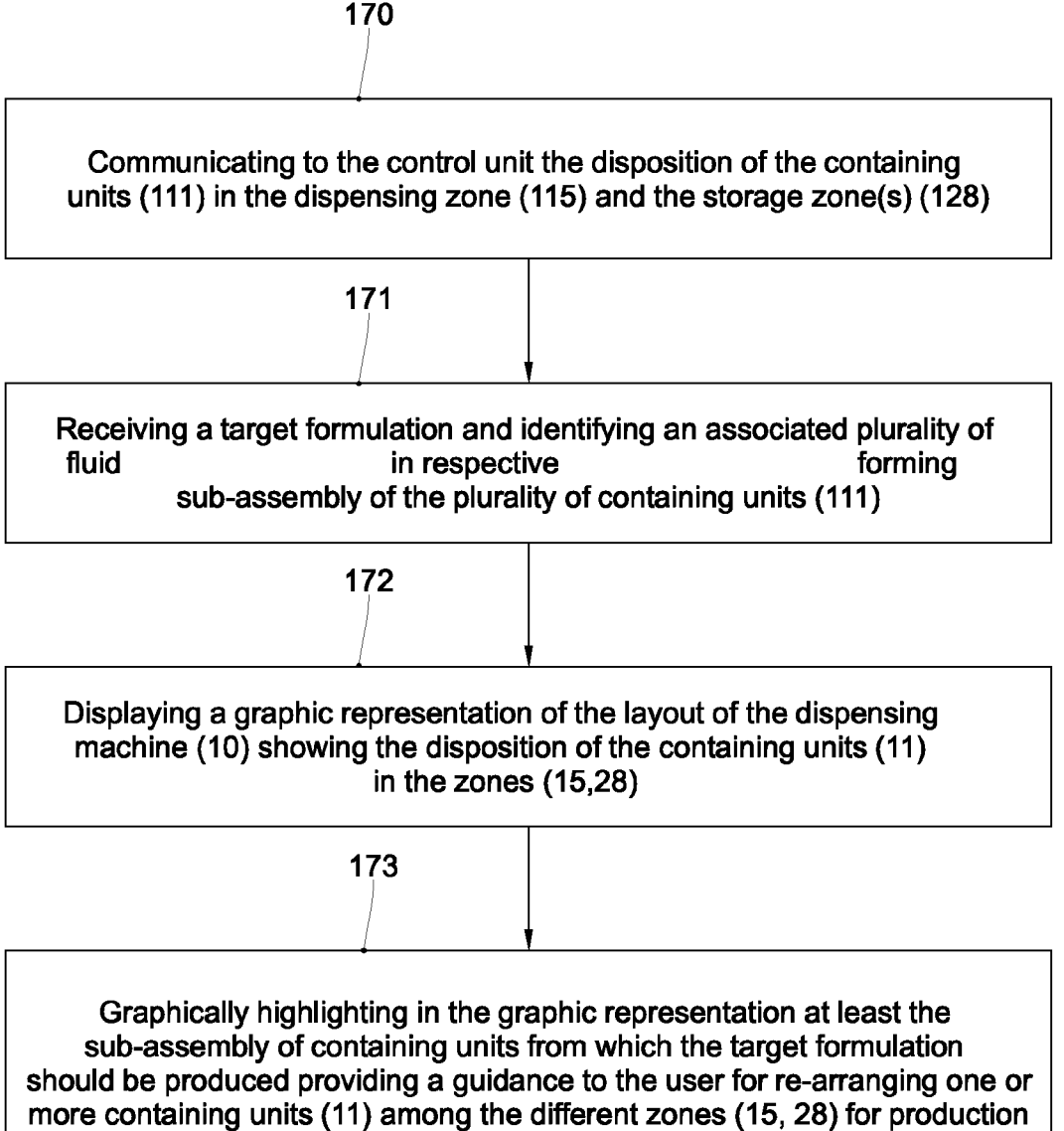

170

Communicating to the control unit the disposition of the containing
units (111) in the dispensing zone (115) and the storage zone(s) (128)

171

Receiving a target formulation and identifying an associated plurality of
fluid                              in respective                              forming
sub-assembly of the plurality of containing units (111)

172

Displaying a graphic representation of the layout of the dispensing
machine (10) showing the disposition of the containing units (11)
in the zones (15,28)

173

Graphically highlighting in the graphic representation at least the
sub-assembly of containing units from which the target formulation
should be produced providing a guidance to the user for re-arranging one or
more containing units (11) among the different zones (15, 28) for production fig. 13B

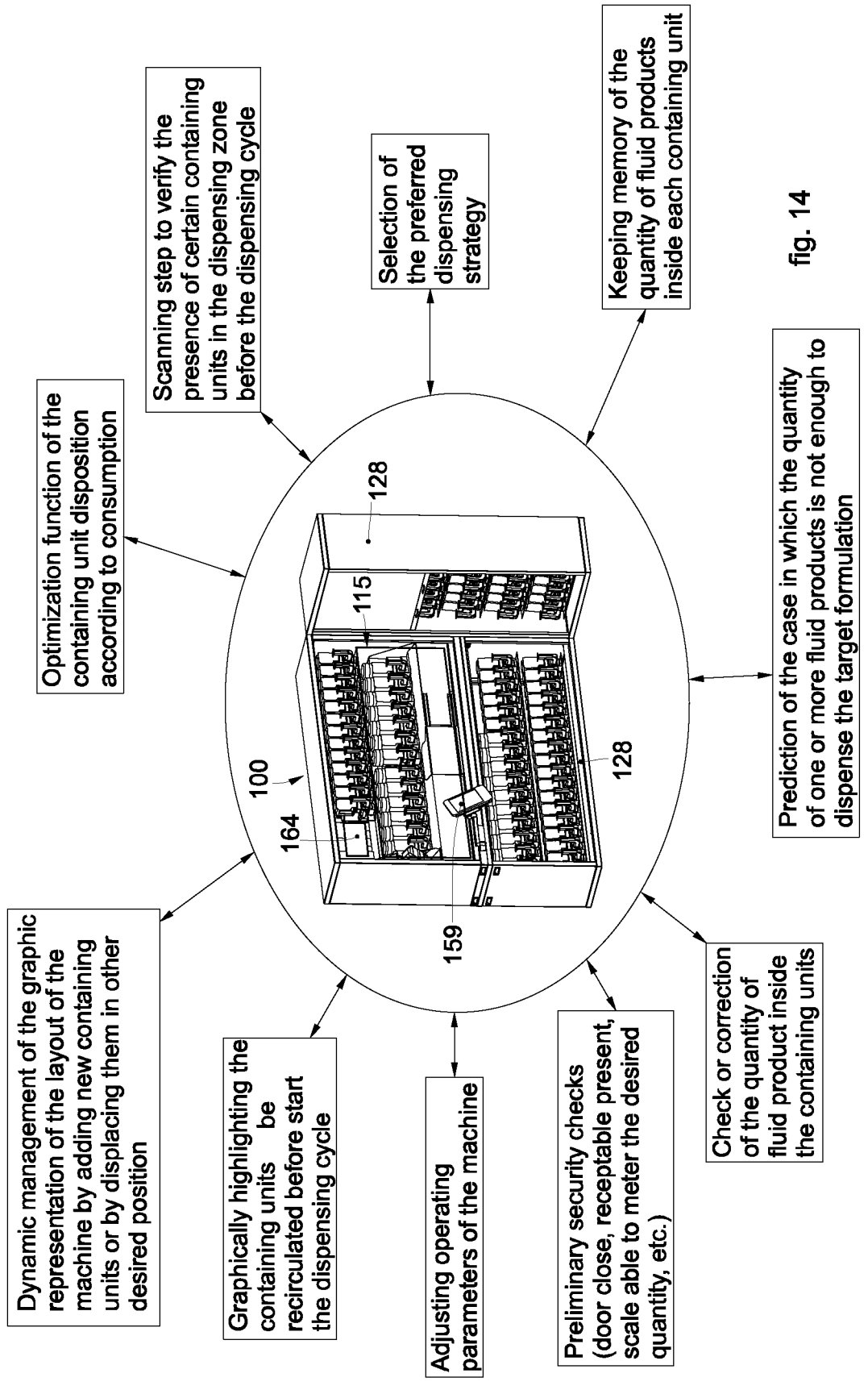

Scanning step to verify the presence of certain containing units in the dispensing zone before the dispensing cycle Selection of the preferred dispensing strategy Keeping memory of the quantity of fluid products inside each containing unit Optimization function of the containing unit disposition according to consumption Prediction of the case in which the quantity of one or more fluid products is not enough to dispense the target formulation Dynamic management of the graphic representation of the layout of the machine by adding new containing units or by displacing them in other desired position Graphically highlighting the containing units be recirculated before start the dispensing cycle Adjusting operating parameters of the machine Preliminary security checks (door close, receptable present, scale able to meter the desired quantity, etc.)

Check or correction of the quantity of fluid product inside the containing units

METHOD TO CONTROL A DISPENSING MACHINE OF FLUID PRODUCTS

CROSS-REFERENCE TO RELATED APPLICATIONS

This application is a continuation application of and claims priority under 35 U.S.C. § 120 and priority under 35 U.S.C. §§ 363, 365 to International Patent Application No. PCT/IT2020/050151, filed Jun. 16, 2020, which was published in the English language, and which claims priority under 35 U.S.C. § 119 to Italian Application No. 102019000009267, filed Jun. 18, 2019. The entire disclosures of these applications are incorporated herein by reference.

BACKGROUND OF THE INVENTION

Field of the Invention

The present invention concerns a computer-implemented method to control the functioning of a dispensing machine configured to deliver fluid products. In particular, the method according to the present invention allows to manage the dispensing machine to prepare user-defined formulations, such as for example paint formulations, particularly in the field of refinishing or repair applications, in an efficient manner.

Description of Related Art

The preparation of a complex formulation from a number of available fluid ingredients according to a user-defined recipe is encountered in many different fields. For example, in automotive body shops a customized paint formulation has to be prepared, which accurately matches the color of the car to be repaired as already slight deviations between the original paint on undamaged portions of the car and the paint used for repair will be visible to an observer.

Therefore, different machines dispensing coloring fluid products configured to deliver a plurality of such products into a receptacle according to a predetermined delivery sequence to provide a desired formulation to an operator have been developed.

In this sector, dispensing machines with fully automatic functioning or dispensing machines with semi-automatic functioning are known, in which the intervention of the operator is provided to manage the different dispensing cycles.

Generally automatic machines can be more cumbersome and less flexible.

On the contrary, semi-automatic machines, in addition to being frequently smaller than automatic machines, offer a more flexible functioning, which is better suited to the different needs of users.

Typically, in dispensing machines with semi-automatic functioning, the operator picks up one or more containers of coloring fluid products required in the formulation to be dispensed, and puts them in a dispensing zone, in which the coloring fluid products are dispensed from the respective containers, one after another, inside a receptacle. So that the dispensing machine is able to deliver the desired formulation in a precise and reliable manner, metering means are provided to measure the quantity of fluid product that is delivered, such as for example a scale to measure the weight of the product delivered, or suitable means to measure the volume of the product delivered.

One disadvantage of dispensing machines with semi-automatic functioning is that their correct functioning depends on the correct management of the containers of coloring fluid products by the operator, who therefore has to operate with skill and precision.

Another disadvantage of these dispensing machines is that, between one dispensing cycle and the next one, a certain "set-up" time of the machine is required, in which the containers of the fluid dispensing product already dispensed are removed from the dispensing zone, and the containers of coloring fluid products are put in this zone necessary to dispense the subsequent formulation of products. The "set-up" time requires long interventions by the operator, the duration of which increases in the event of errors or unforeseen events, such as for example if the coloring fluid product finishes during a dispensing cycle.

One purpose of the present invention is to provide a method to control the functioning of a dispensing machine for fluid products for preparing formulations selected by the user which can alleviate or obviate one or more, such as for example one, some or all of the above disadvantages of the state of the art. Therefore, the control method according to the present invention should allow to obtain a great variety of color formulations, such as for example those encountered in refinishing applications in the automotive sector, starting from a plurality of fluid products according to predetermined proportions in a reliable, rapid, safe and economical manner, which allows to accurately supply target formulations with a high volume of production, without requiring long and laborious interventions by the operator.

The Applicant has devised, tested and embodied the present invention to overcome the shortcomings of the state of the art and to obtain these and other purposes and advantages.

BRIEF SUMMARY OF THE INVENTION

The present invention is set forth and characterized in the independent claims, while the dependent claims describe other characteristics of the invention or variants to the main inventive idea.

In accordance with the above purposes, the present invention relates to a computer-implemented method to control the functioning of a dispensing machine configured to deliver fluid products and comprising a plurality of containing units, each containing a respective fluid product, the machine being provided with one or more storage zones of the containing units and a dispensing zone in which it is provided to locate, selectively and temporarily, a sub-assembly of the containing units containing the fluid products to be delivered in a dispensing cycle. The computer-implemented method makes use of a computing device comprising at least one processor. It may further utilize storage means with a formulation database, and typically an input device, and a display device. The input device and the display device may also be embodied in a single device such as in case of a display of the touchscreen type. The control method may comprise determining the disposition of the plurality of containing units in the dispensing zone and in the storage zone(s). It may further comprise receiving, for example via the input device, a target formulation, selected by the user and identifying, via the processor, from the formulation database an associated plurality of fluid products contained in respective containing units of the sub-assembly, each to be delivered according to a predetermined quantity in order to obtain the target formulation. The control method according to the invention may also comprise displaying a graphic representation of the layout of the dispensing machine with the dispensing zone and the storage zone(s), which respectively reflects the disposition of the plurality of containing units in the dispensing zone and in the storage zone(s). It may further comprise graphically highlighting, in the graphic representation, at least the sub-assembly of containing units by means of signaling means so as to facilitate their identification by the user and thus provide guidance to the user for displacing of one or more than one containing unit(s) from the storage zone(s) to the dispensing zone, or vice versa, if required for the production of the target formulation. The method may further comprise displacing, by the user, one or more than one containing unit(s) from the storage zone(s) to the dispensing zone, or vice versa, accordingly, if needed. The target formulation may then be prepared from the sub-assembly of the containing units containing the fluid products to be delivered in a dispensing cycle.

The present invention is also drawn towards a dispensing machine controlled according to the disclosed computer-implemented method. Such a dispensing machine is configured to deliver fluid products inside a receptacle and comprises a plurality of containing units, each containing a respective fluid product, one or more storage zones of the containing units, and a dispensing zone in which it is provided to locate, temporarily and selectively, a sub-assembly of containing units containing the fluid products to be delivered in a dispensing cycle. It may further comprise a slider on which a scale is disposed, provided with a support plane for the receptacle and mobile on linear guides so as to slide parallel to a longitudinal direction so that the slider, together with the scale and the receptacle, can move below the sub-assembly of containing units. The dispensing machine can also comprise a programmable processor or control unit configured to implement the control method as described above. The dispensing machine may further comprise a display, for example of the "touch" type, which defines interface means by means of which the operator can control the functioning of the dispensing machine and display the graphic representation thereof.

Another aspect of the invention is directed to a computer-readable medium containing executable program code for configuring a programmable processor or control unit comprised by or operatively linked to a dispensing machine such as a dispensing machine set forth above to carry out the computer-implemented method according to the present invention. The dispensing machine and its control method according to the present invention allow to obtain a desired formulation starting from a plurality of fluid products according to a recipe defined by the user in a reliable, safe and economical manner with high precision and speed. It helps the operator to efficiently manage the containers of the fluid products provided in the machine so that it is easy to use and the operations that the operator must perform on the containers are fast and characterized by a high degree of reliability, which reduces the risk of errors.

Thus, a characteristic advantage of the method according to the invention, which can be obtained thanks to said means to visually highlighting the containing units, is to assist the user in placing the different containing units needed for production of a certain target formulation from the storage zone(s) in the dispensing zone.

This allows, advantageously, to significantly reduce the time required for the user to remove the containing units from the storage zones and to position them in the dispensing zone, or vice versa, also significantly reducing the risk of errors. In fact, errors in removing a containing unit lengthen the dispensing cycle times because obviously it will be necessary to replace the containing unit erroneously positioned by the correct one, comprising the fluid product comprised in the desired formulation. Experiments and tests have shown that thanks to the method to control the functioning of a dispensing machine according to the present invention, it is possible to reduce even by thirty percent, with respect to the semi-automatic dispensing machines known in the state of the art, the time required by the user to identify containing units that have to be moved from one zone to another.

Another characteristic advantage of the present invention is that the control method allows to manage the dispensing machine in a flexible and intuitive manner. According to some versions of the control method which will be described in the present description, the signaling means to graphically highlight some containing units disposed in the storage zone(s) and/or in the dispensing zone selectively allow the user to provide useful information about the state of the unit itself, such as for example the volume of fluid product contained therein, or the time elapsed since the last use of that same unit.

The fluid products used in accordance with the present invention can in particular comprise or be coloring fluid products. Consequently, the present invention is particularly useful for preparing color formulations. It can for example be used to provide paint formulations defined by the user, particularly for refinishing or repair purposes, for example in a body shop for painting a vehicle body.

These and other optional aspects, characteristics and advantages of the present disclosure will be better understood with reference to the following description, drawings and attached claims. The drawings, which are integrated and form part of the present description, show some non-limiting forms of embodiment of the present invention, and together with the description, are intended to describe the principles of the disclosure.

BRIEF DESCRIPTION OF THE SEVERAL VIEWS OF THE DRAWING(S)

Figure 1:
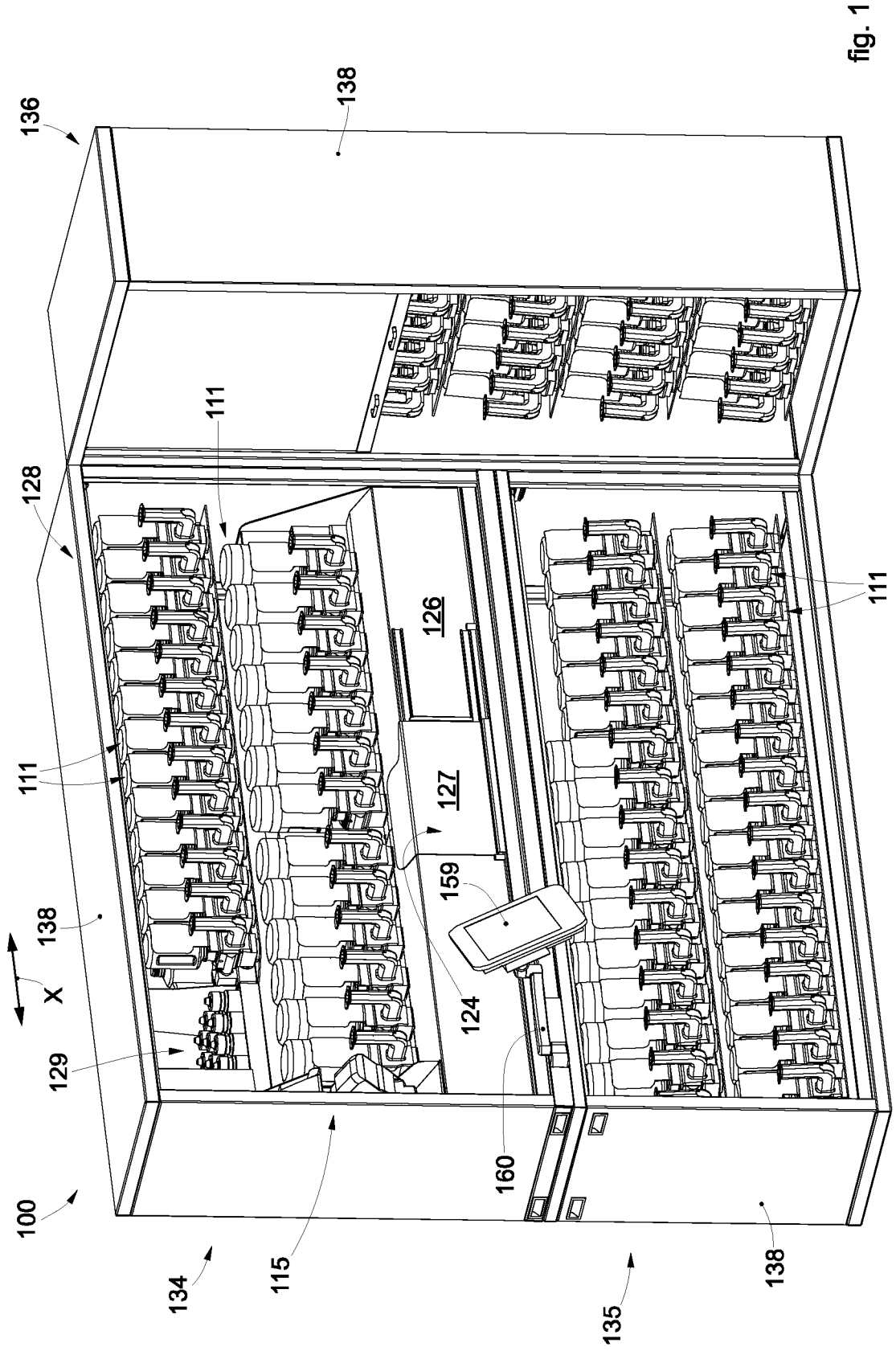
FIG. 1 is a perspective view of an embodiment of a dispensing machine to deliver fluid products according to the present invention.
Figure 5:
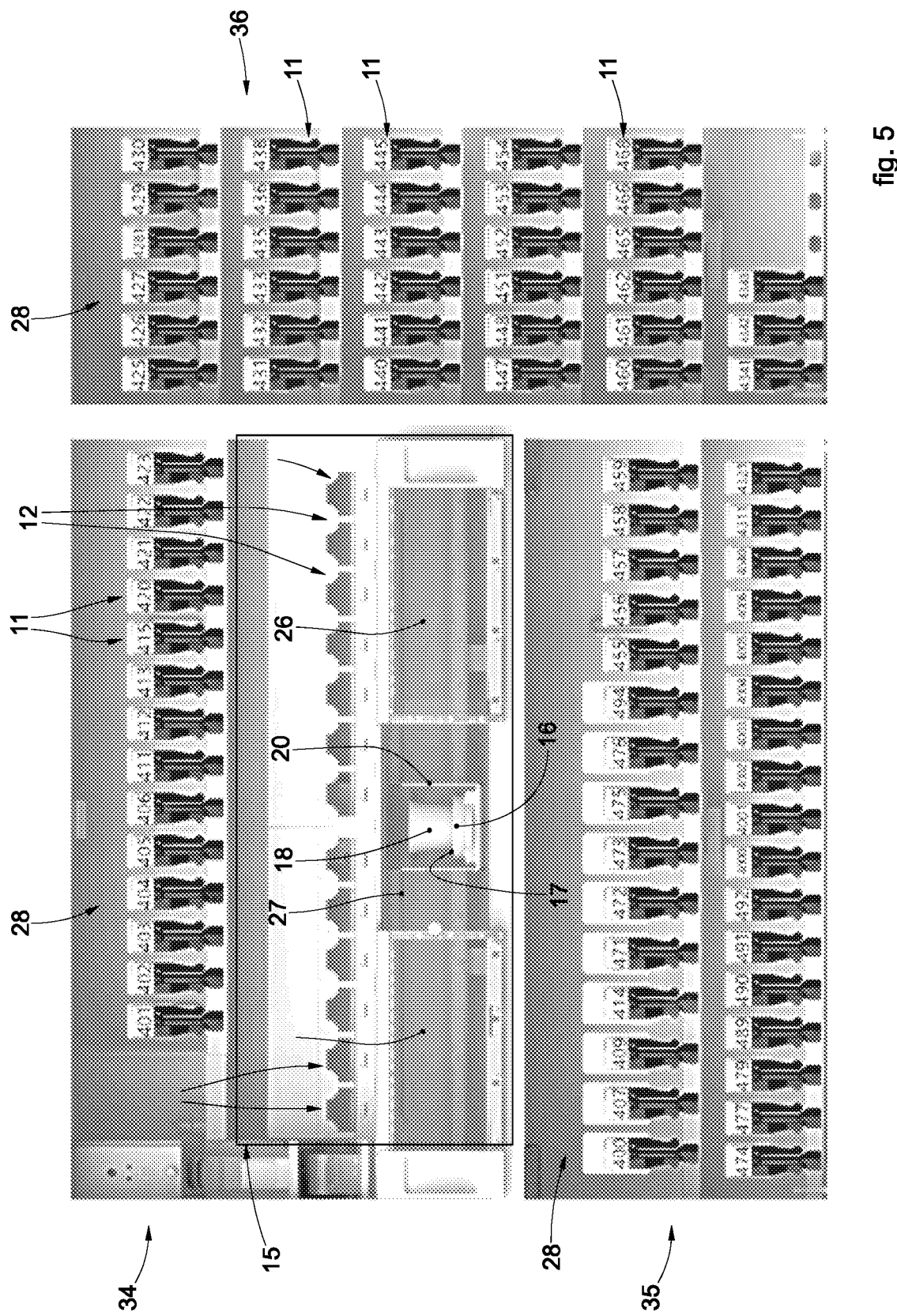
Figure 6:
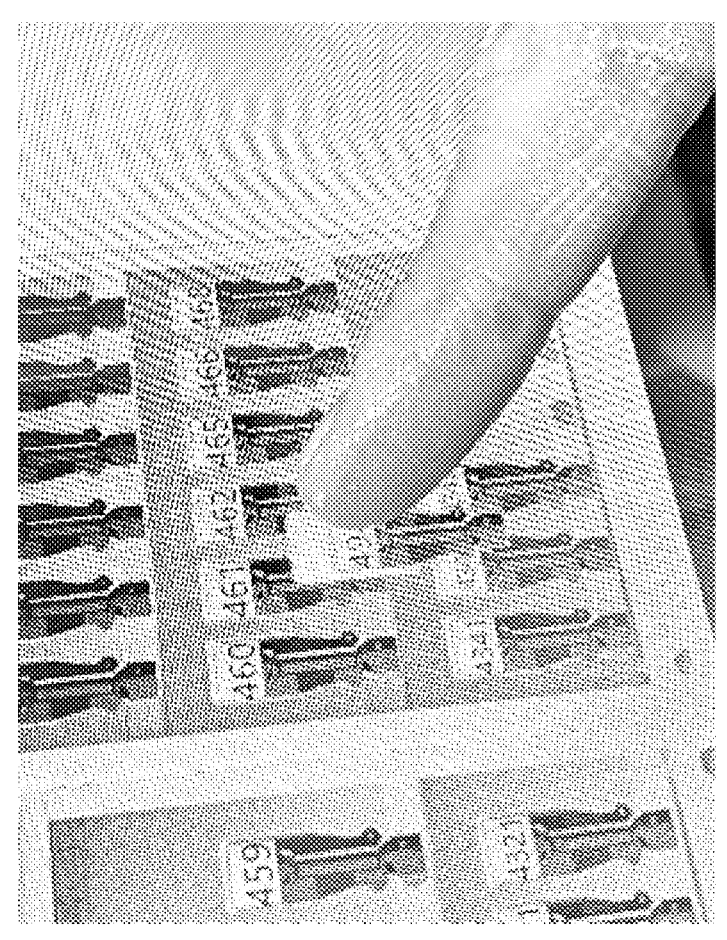
Figure 13A:
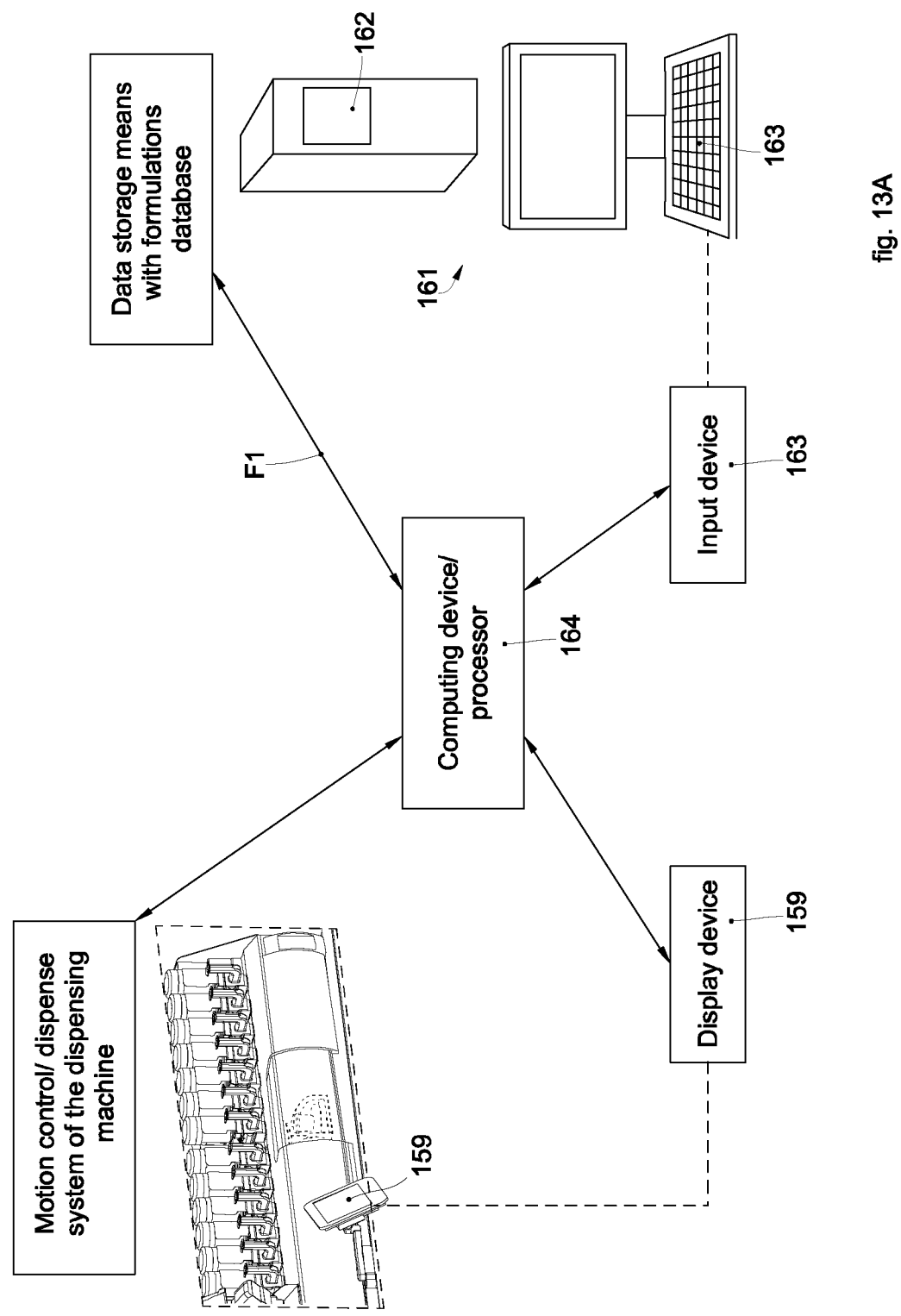

FIGS. 5 and from 7 to 12 are front elevation views, schematic, which show operative representations of the dispensing machine of FIG. 1 correlated to corresponding functions or steps of the control method according to the present invention, said operative representations being visible to a user on interface means operatively associated with the dispensing machine itself;

FIG. 6 is a perspective view of an enlarged detail of an operative representation of the dispensing machine of FIGS. 5 and 7-12;

FIG. 13A is a schematic view of means for carrying out the computer-implemented control method;

FIG. 13B represents a schematic block diagram illustrating the method to control a dispensing machine in accordance with the present invention; and FIG. 14 is a schematic representation of different operating functions that may be present in the method of controlling a dispensing machine in accordance with the present invention, using diagram blocks.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF THE INVENTION

The present invention concerns a control method of a dispensing machine in accordance with the above. As also illustrated in FIG. 13B the control method according to the invention may comprise a step of determining the disposition of the plurality of containing units in the dispensing zone and in the storage zone(s) of the machine. It may further comprise receiving, e.g. via the input device or via the display device, a target formulation, selected by the user, and identifying, via the processor, from a formulation database an associated plurality of fluid products contained in respective a sub-assembly of the containing units, each to be delivered according to a predetermined quantity in order to obtain said target formulation. The method may further comprise displaying a graphic representation of the layout of the dispensing machine with said dispensing zone and said storage zone(s), which respectively reflects the determined disposition of said plurality of containing units in said dispensing zone and in said storage zone(s). The method may further comprise graphically highlighting, via the processor, in said graphic representation, at least said sub-assembly of containing units from which the selected target formulation is to be produced by means of signaling means so as to facilitate their identification by the user and thus provide guidance to the user for displacing of one or more than one containing unit(s) from the storage zone(s) to the dispensing zone, or vice versa, if required for the production of the target formulation.

The signaling means in the graphic representation may for example, without being limited thereto, comprise graphic lines or symbols, such as for example arrows or exclamation marks. The graphic lines or symbols can be formed by dashed and/or colored and/or flashing dots, which can be disposed above or around the containing units comprised in said sub-assembly of containing units from which the selected target formulation is to be produced disposed in the dispensing zone and/or in the storage zone(s). The method may further comprise displaying, on the display device, a list of codes, for example numerical or alphanumerical, each univocally associated with a respective fluid product contained in the sub-assembly of containing units, optionally combined with the graphic representation of the layout of said dispensing zone. Said step of graphically highlighting may comprise highlighting one or more lines of the list of codes with a particular coloring, possibly intermittently flashing, and/or graphically highlighting via the processor the corresponding containing unit corresponding to the fluid product highlighted in the list, also in the graphic representation of the layout of the dispensing zone by means of said signaling means. The graphic highlighting of one or more rows of the list of codes, and of the correlated containing units, can indicate the presence or absence of the containing unit comprising the fluid product in the dispensing zone or the fact that the quantity of fluid product present in the containing unit is not sufficient to complete the dispensing cycle to obtain the target formulation selected. In one example, the method described here can comprise scanning, prior to initiating the dispensing cycle, the containing units located in the dispensing zone, in particular by means of optical detection means suitable to read a code, for example a bar code, associated with each of said containing units in order to verify which containing units are located in the dispensing zone, and then displaying the results of the scan on the display device. In one possible version, the displaying of the results of the scan provides associating an indicator with the lines of said list of codes with information about the presence or absence of the corresponding containing unit in the dispensing zone and/or optionally associating lines or graphic symbols with the corresponding containing unit whose presence has been verified, in the graphic representation of the layout of the dispensing zone. Optionally, the method may further comprise keeping record of the quantity of residual fluid product contained inside a container of known nominal capacity comprised by each containing unit. This may involve calculating, via the processor, the quantity of residual fluid product contained in a container comprised in the containing unit as the difference between the quantity contained in the container prior to the dispensing cycle, and the quantity delivered in said dispensing cycle. The method may comprise displaying, on the display device, in the graphic representation of the layout of the machine, in particular in a schematic manner, the quantity of residual fluid product inside the respective container, at least for each of the containing units comprised in said sub-assembly. The method according to the present invention may further provide for setting, via the input device, a lower limit threshold value of the quantity of residual fluid product contained in the container. In such case the method may optionally comprise graphically highlighting in the graphic representation of the layout of the dispensing machine, in particular in the graphic representations of the dispensing zone and/or the storage zone(s), the containing units in which there is a quantity of residual fluid product which is lower than the threshold value. The method may optionally further comprise before each dispensing cycle, selecting, via the input device, a dispensing mode by the user. The dispensing mode can for example be selected from a mode that can provide for a sequential dispensing of the fluid products, according to the order provided in the list of products memorized in the target formulation, or according to the order by which the containing units of said sub-assembly are placed in the dispensing zone, or a mode that provides for dispensing, first or respectively last, the fluid product(s) to be dispensed contained in the containing unit(s) in which there is a quantity of residual fluid product which is lower than the aforesaid lower limit threshold value. In the method according to the present invention, the position of the containing units in the representation of the layout of the storage zone(s) and/or of the dispensing zone of the dispensing machine, can be implemented to be modifiable by selecting, one at a time, the containing unit(s) to be moved and dragging it to a position. The control method described here can further provide that, in the representation of the layout of the storage zone(s) and/or dispensing zone of the dispensing machine, means, such as a dialog window, are foreseen to modify manually the quantity of residual fluid product contained inside the container comprised in the containing unit, via the input device, to set a new updated value, in particular expressed in volume, of the quantity of residual fluid product. For example, this new updated value can be obtained by the user using a scale provided in the dispensing machine and weighing one containing unit at a time on it; taking into account the known tare of the containing unit and the specific weight of the fluid product contained therein. According to some versions, the method further comprises storing, e.g. on the storage means, for each containing unit, the last use date in a dispensing cycle, comparing, via the processor, the time elapsed from the last use date with a pre-established time threshold, in particular expressed in days or weeks, and subjecting the containing unit(s) for which the comparison reveals that the time elapsed since the date of last use is longer than said predetermined time threshold to an internal recirculation operation of the fluid product contained therein, when said containing unit is disposed in the dispensing zone, before the next dispensing cycle in which the fluid product contained therein is to be delivered. The method may further comprise graphically highlighting, by means of said signaling means, in the graphic representation of the layout of the dispensing machine, in particular in the graphic representations of the dispensing zone and/or the storage zone(s), the containing unit(s) that have been identified as units to be recirculated. In some exemplary versions, the method further comprises informing the user, possibly positioned at a distance from the dispensing machine, about the status of the dispensing cycle of the machine by means of visual signaling means, for example configured as one or more LED lights, e.g. strips of LED lights, associated with said dispensing zone suitable to assume different colors for the different operating steps of the dispensing machine. Moreover, the method may optionally comprise sending, via the processor, a warning signal to the user to inform him/her of a problem or malfunction of the dispensing machine, for example by a text message or email on an electronic device supplied to the user or an alert on a smartwatch worn by the user. According to some possible versions, the control method further comprises checking, via the processor, before each dispensing cycle, by means of a presence sensor in communication with the computer device, whether the receptacle is present and correctly mounted in the dispensing machine and preventing, in the event that the presence sensor detects that the receptacle is absent or incorrectly mounted, the dispensing cycle from starting and sending an alarm signal informing the user that the receptacle is missing or incorrectly mounted. According to some examples, the method comprises adjusting, via the input device, the operating parameters of the dispensing machine which control the dispensing cycle, in particular the dispensing speed of the fluid product by a pumping unit which drives the flow of fluid product and/or the speed of translation of a slider on which a scale is disposed, provided with a support plane for said receptacle and/or the maximum dispensing tolerance that is acceptable, possibly individually for each fluid products contained in respective containing units.

The afore-mentioned different functionalities that can be implemented in the control method of the present invention can make use of or be imparted by respective computer-executable instructions or program code. Such computer-executable instructions or program code may comprise, for example, program code, instructions and data which, when executed at one or more processors or programmable control unit, cause the dispensing machine and/or a computer system operatively linked thereto to perform a certain function or group of functions of the control method according to the present invention as described above and in a more detailed manner herein below. Computer-executable instructions may be, for example, binaries, intermediate format instructions such as assembly language, or even source code. In the practice of the present invention physical and other computer-readable media for carrying or storing such computer-executable instructions and/or data structures can be utilized. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, the invention can make use of at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionalities of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Implementation of the control method according to the present invention generally involves the use of a computing device, also referred to herein as computer system. The computer system may comprise or utilize a special-purpose or general-purpose computer system that includes computer hardware, such as, for example, one or more processors and system memory. The computer system is generally operatively connected (e.g. by a wired or wireless connection or a combination thereof) to the dispensing machine. For example, the computer system can comprise or be operatively connected to an electronic control unit of the dispensing machine. The computing device can be integrated in the dispensing machine, for example disposed within the cabinet housing the dispensing zone and/or a cabinet housing one or more storage zone(s). Alternatively, the computing device or system can be or comprise external/remote means or components, which are not physically associated with the dispensing machine as such. Those skilled in the art will appreciate that the invention may accordingly be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices. For example, in the practice of the invention, the formulation database used in the method according to the present invention can be stored on remote storage means, e.g. on a server in a network or cloud environment, where it can be accessed and data retrieved therefrom by a client (such as a local or mobile computing device accessible to the user) via a suitable data transmission link.

The control method of the present invention further involves use of an input device, display device or a combination thereof for interacting with a user, such as to receive user input, for example a selection of a certain target formulation to be produced by the dispensing machine, or to present information, e.g. the graphic representation of the layout of the dispensing machine with specific information and/or graphical highlighting on certain containing units as set forth above, to the user. These devices can be operatively connected to the computing system by any suitable means, for example by a wired connection or a wireless link or combination thereof as described previously. Useful input devices include any devices capable of providing user input to a computer system such as, without being limited thereto, a keyboard, mouse, track ball, touch pad or any other touch responsive input device. Display devices that can be used in accordance with the present invention include any kinds of displays and screens known in the art such as for example, without being limited thereto, cathode ray tube monitors, LCD-type displays or LED- or plasma-technology based screens. The display device can be mounted to the dispensing machine, for example to the front side of the main cabinet that comprises the dispensing zone, or be remote device that is not physically attached to the dispensing machine. The display device can preferably comprise a display of the touch screen type, in which case it combines input and displaying capabilities in a single device. The display device used in the method of the present invention can thus for example comprise, without being limited thereto, a touchscreen associated with the dispensing machine, or a remote electronic device accessible to the user, operatively associated with the dispensing machine, but independent from it, such as for example a tablet, portable laptop, or smartphone.

With reference to the drawings, we will now describe a dispensing machine for fluid products, and a corresponding control method in accordance with the present invention.

Figure 2:
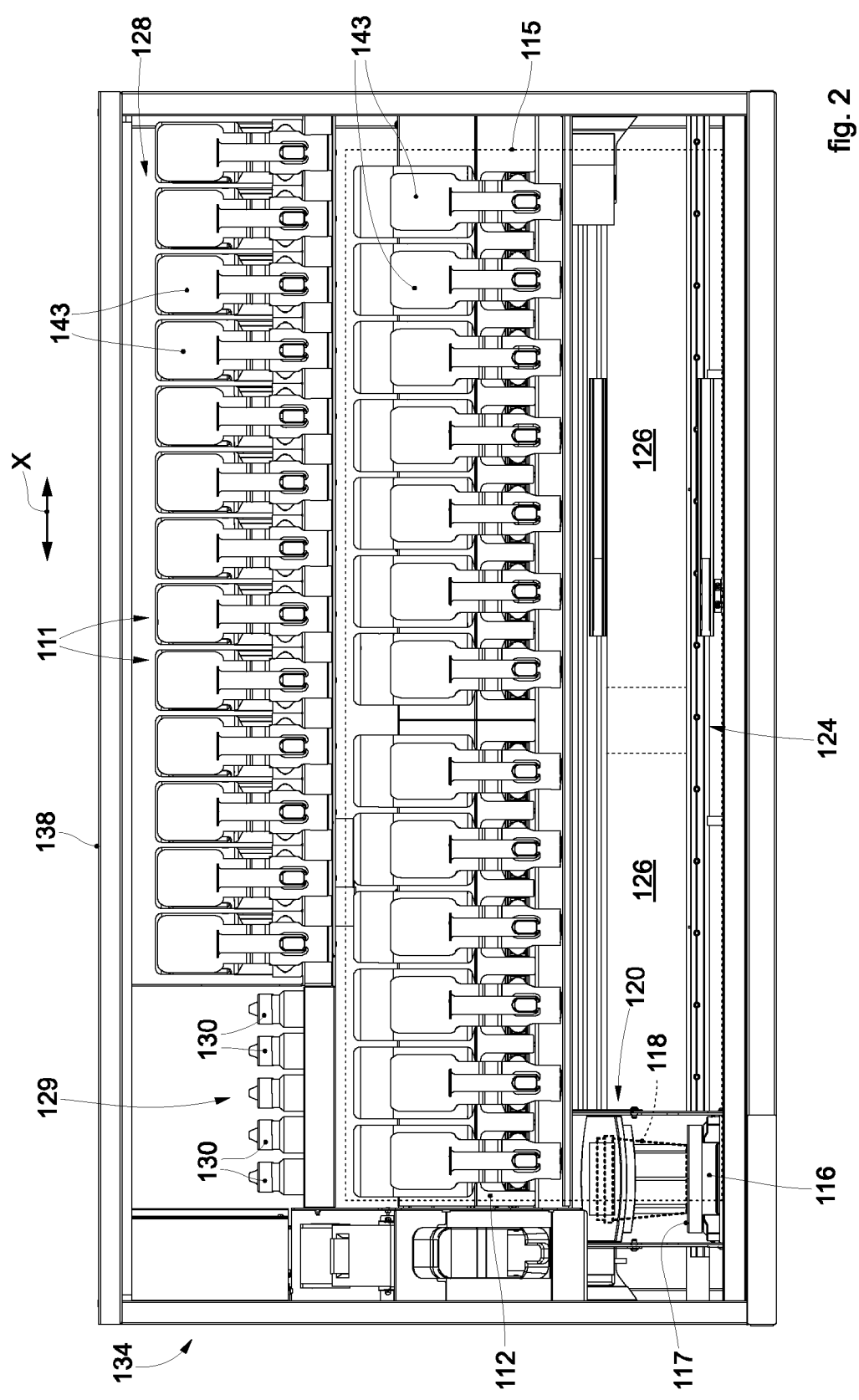
FIG. 2 is a front elevation view of a portion of the dispensing machine of FIG. 1, in which some elements have been removed for the sake of clarity.
Figures 3, 4A, 4B:
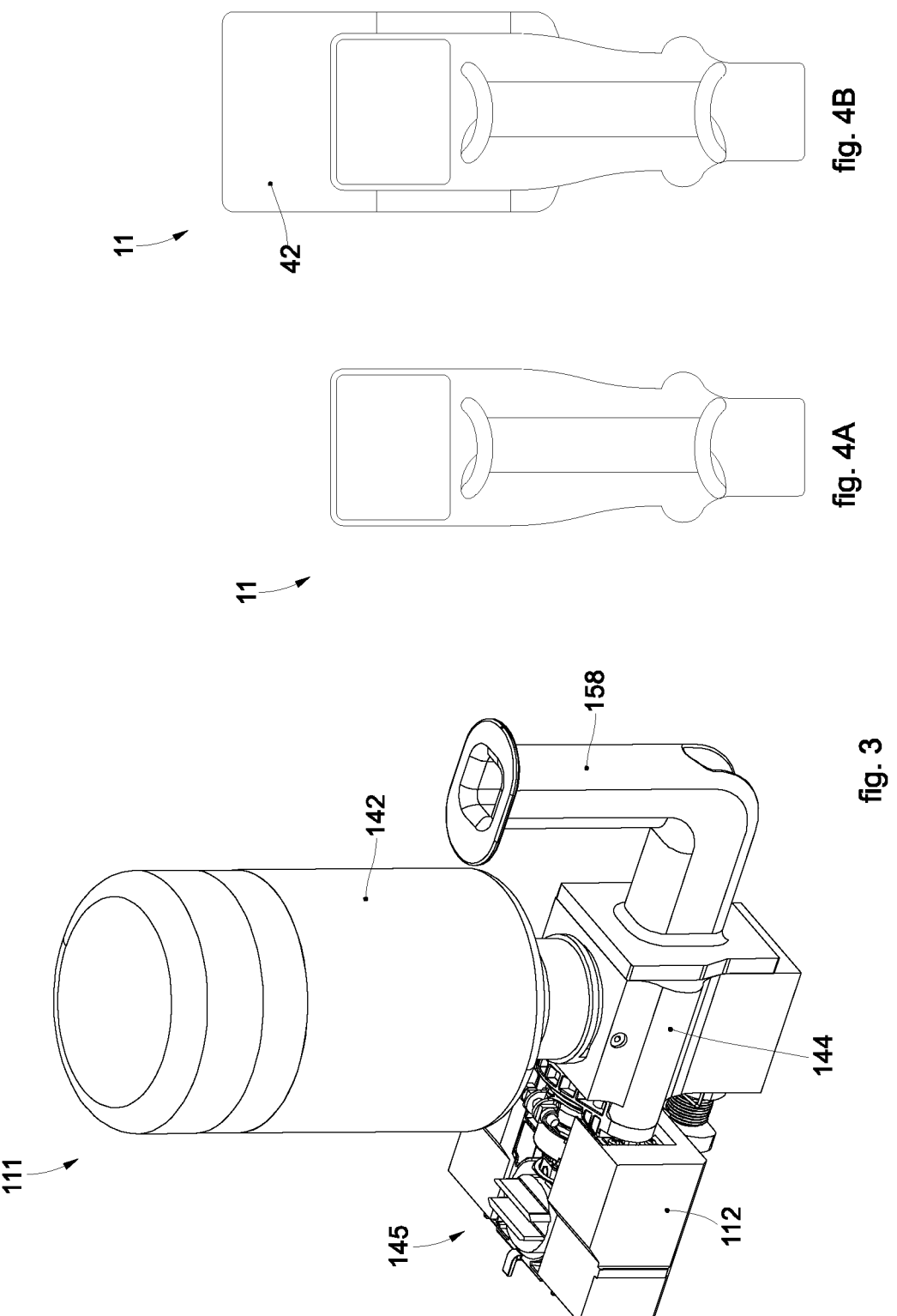
FIG. 3 is a perspective view of a containing unit associated with means to support the dispensing machine of FIG. 1.
FIGS. 4A and 4B are front elevation views, schematic, showing a representation of two different versions of the containing unit of FIG. 3, visible to a user on interface means operatively associated with the dispensing machine.

In order to better understand the control method according to the present invention, with particular reference to FIGS. 1-3, an exemplary embodiment of a dispensing machine suitable to be controlled by said method is first described.

For example, a dispensing machine suitable to be controlled by the method according to the present invention is described in the Italian patent application number IT 102018000006154, in the name of the same Applicants, incorporated herein by way of reference.

The dispensing machine controlled by the control method of the present invention, visible in FIG. 1, is indicated overall by the reference number 100. The dispensing machine and its components, as well as the steps or substeps of the control method, shown in the attached drawings are intended for the illustration of the invention and they must not be understood as a limitation. For example, the characteristics shown or described as being part of one embodiment can be adopted on or in association with other embodiments to produce another embodiment. It is understood that the present invention will be inclusive of such modifications and variations.

The dispensing machine 100 comprises a plurality of units for containing the fluid product, each of which being indicated by the reference number 111.

The dispensing machine 100 comprises support members 112 which act as support means to support the containing units 111, by means of suitable attachment devices, known in the state of the art, configured to receive and temporarily hold, in a releasable manner, a coupling portion comprised in the containing units 111.

The support members 112 can be sized and configured to support, in an ordered manner, for example according to a configuration with overlapping rows, any desired number and type of containing units 111.

In the dispensing machine 100 a dispensing zone 115 is defined, indicated by a broken line in FIG. 2, where an enlarged portion of the dispensing machine 100 is visible. In the dispensing zone 115 support members 112 are disposed to support, in the manner described above, up to thirteen containing units 111.

The support members 112 are oblong and in particular can have a linear extension in a direction parallel to a longitudinal direction X. The oblong support members are generally disposed in such a way that the longitudinal direction X is substantially parallel to the ground where the machine is installed.

In the example shown, the dispensing machine 100 comprises a scale 116 (FIG. 2), as a non-restrictive example of a metering means suitable to meter a quantity of fluid product that has been delivered.

For example, the scale 116 can be a digital scale, of a type known in the state of the art, having a sensitivity of 0.01 grams or better.

The scale 116 can comprise a support plane 117 on which a receptacle 118 can be disposed, inside which the various fluid products are delivered to obtain the desired formulation. The receptacle 118 can be a can, or another container, open at the top, with a substantially cylindrical or truncated-cone shape, and having a capacity suitable to contain the expected quantity of the desired formulation.

The scale 116 can be disposed on a slider 120 (FIG. 2) mobile on linear guides (not shown) and operatively associated with a drive motor (not shown), which controls its displacement.

The slider 120 can then slide parallel to the longitudinal direction X in a bi-directional manner. In this way, the slider 120, and with it the scale 116 and the receptacle 118, can move below all the containing units 111 disposed in the dispensing zone 115.

The dispensing machine 100 can optionally comprise a removal position 124, in which the receptacle 118 can be removed by the operator.

For example, the removal position 124 can be disposed in an intermediate position of the dispensing zone 115, about halfway (for example 50%±10%) with reference to the size of the oblong support means in the longitudinal direction X.

In the functioning of the machine, for example, the slider 120 can be moved to the removal position 124 at the end of dispensing of the fluid product, so that the operator can remove the receptacle 118 which has been filled with the desired formulation and/or add manually additional ingredients.

According to the example shown, the dispensing machine 100 can also comprise protection elements 126 which frontally shield that part of the dispensing zone 115 where the slider 120 slides to ensure safe functioning of the machine.

The protection elements 126 can be transparent. This is advantageous as this allows users to see the slider 120 during its linear movement while the dispensing machine is operating, which is useful for example for demonstration purposes as well as for the visual detection of a possible malfunction.

The protection elements 126 optionally comprise a door 127 which is selectively openable by the operator to access the removal zone 124.

For example, the door 127 can be configured to slide and retract inside one of the protective elements 126 adjacent to it.

The dispensing machine 100 can comprise one or more than one storage zones 128 configured to store a plurality of containing units 111, from which the ones to be disposed in the dispensing zone 115 can be selected.

A storage zone 128 can be disposed, for example, above and/or below the dispensing zone 115.

The storage zone(s) 128 can comprise respective support members, for example similar to the support members 112 described above in the context of the dispensing zone 115, to support and hold the coupling portions of the containing units 111.

In a storage zone 128 the containing units 111 can be disposed adjacent to one another, so as to define a sort of support shelf, which extends parallel to the longitudinal direction X. In other words, in a storage zone 128 the containing units 111 can be stored in a row, which is parallel and disposed above or below the row of containing units 111 disposed in the dispensing zone 115.

The storage zone(s) 128 can optionally comprise an auxiliary compartment 129 configured to receive one or more accessory elements 130 useful for completing the formulations.

For example, the accessory elements can comprise flasks or bottles 130 containing additives or substances that the operator can wish to manually add inside the receptacle 118 for example after it has been filled, at the end of the dispensing of the fluid products.

The dispensing machine 100 can be formed from a plurality of adjacent modular elements 134, 135, 136, which can be reciprocally joined together.

A first modular element 134, or main module, is visible enlarged in FIG. 2 and comprises the dispensing zone 115, and a storage zone 128, configured to support a row of containing units 111 disposed parallel and above the containing units 111 disposed in the dispensing zone 115. If the auxiliary compartment 129 is present, it is disposed in the first modular element 134.

The first modular element 134 can have, for example, a length of approximately 2 meters in the longitudinal direction X, a height of approximately 1 to 1.5 meters and a depth of approximately 0.5 meters.

A second and a third modular element, respectively indicated by the reference numbers 135 and 136 in FIG. 1, comprise other storage zones 128 of the containing units 111 which, if necessary, can be removed by the operator to be disposed in the dispensing zone 115. In this way, the dispensing machine 100 can store a large number of containing units 111, for example up to eighty containing units 111 (in addition to those disposed in the dispensing zone 115).

The first modular element 134 can be situated, for example, above the second modular element 135, while the third modular element 136 can be on the left or right side of the remaining modular elements 134, 135, for example disposed perpendicular thereto (as shown in FIG. 1) or aligned with them in order to provide an extension along the longitudinal axis X.

Typically, the second modular element 135 has approximately the same length and depth as the first modular element 134 which is positioned above it, but can have a height of less than 1 meter, for example approximately 800 mm.

In a particular version, in the second modular element 135 the containing units 111 are disposed in two rows overlapping each other, each configured to house up to fifteen containing units 111, while in the third modular element 136, the containing units 111 are disposed according to multiple rows overlapping each other, for example six, of shorter length, each of them being suitable, for example, to house up to six containing units 111.

Both the second modular element 135 and the third modular element 136 can comprise suitable support members, for example similar to the support members 112 described above, able to releasably support and temporarily hold the containing units 111.

The modular elements 134, 135, 136 can each comprise a substantially parallelepiped-shaped frame 138, which is open at the front, so that the operator can easily remove the containing units 111 contained therein.

With particular reference to FIG. 3, the containing unit 111 of the fluid product is now described in greater detail.

The containing unit 111 generally comprises a container 142 for the fluid product, for example a coloring fluid product.

The container 142 can have, by way of example, a volume in a range from 100 mL up to 5 liters, such as for example 0.5 liters, 1 liter or 2 liters.

The containing unit 111 can comprise a front wall 143, overlapping a front portion of the container 142, and configured to receive an identifying label of the fluid product contained in the container. By way of example, the identifying label can comprise a numeric or alphanumeric code univocally associated with a corresponding fluid product.

The containing unit 111 can also comprise a body 144 to which the container 142 is removably connected, for example by means of a threaded connection. Typically, the container 142 is disposed upside down, with the mouth facing downward, that is toward the body 144, and the bottom part facing upward.

The containing unit 111 can also comprise dispensing means to dispense a quantity of the fluid product contained therein. For example, it can comprise a pumping unit 145 of a type known in the state of the art, which for this reason will not be described here in detail. The pumping unit 145 can be, for example, a bellows pump with an alternate movement of the pumping element.

The pumping unit 145 can be driven, for example, by a motor (not shown) which can be disposed on the slider 120 and is mobile together with it. It should be noted that this advantageously allows each containing unit 111 to be without a motor. In fact, when the fluid product is dispensed from a certain containing unit 111, the slider 120 carrying the motor is disposed in correspondence with the latter. In this way, the same motor is operatively associated, on each occasion, with the pumping unit 145 comprised in the containing unit 111 from which the fluid product is to be delivered.

In the body 144 there is a set of conduits (not shown) defining a path for the fluid products along which the pumping unit 145 is disposed and configured to connect the container 142 to an outlet of the containing unit 111, in correspondence with which the fluid product is delivered to the receptacle 118. In the body 144 there may also be provided a plurality of valves (not shown) configured to regulate and control the flow of the fluid products. The conduit assembly comprises a fluid recirculation conduit which, when the valves are suitably positioned in a respective recirculation position, allows the fluid product to be recirculated in the containing unit 111, so that the fluid product leaving the container 142, after having traveled through the conduit assembly, returns to the container itself, without being delivered.

The containing unit 111 can also comprise a handle 158, which allows the operator to easily grip the containing unit 111.

The machine 100 can also comprise a display device 159, for example of the "touch" type, which defines interface means by means of which the operator can control the functioning of the machine 100 and display the graphic representation thereof, in accordance with the control method of the present invention, as described above and in detail hereafter.

The display device 159 can be supported, for example, by a mechanical arm 160 hinged to the frame 138 of the first or of the second modular element 134, 135.

The machine 100 can also comprise a programmable control unit, or processor 164, of a type known in the state of the art, suitable to implement the control method according to the present invention. The control unit or processor can form part of or be operatively linked to a computer system, such as any computer system described above. It can comprise computer-executable instructions or program code for carrying out the various possible functions of the control method disclosed above and in a more detailed manner herein below.

The control method discussed comprises a plurality of operating functions that are provided to control the dispensing machine in a very effective and flexible manner, and which will be described in detail in the following paragraphs.

The control method will subsequently be described with particular reference to FIGS. 5-12, which show examples of operative representations of the dispensing machine 100, or of the dispensing zone 115, which can be displayed to the user, for example, on the display device 159 associated to the dispensing machine as shown in FIG. 1.

In other versions, these operative representations can be displayed, in addition or in substitution with respect to the display device 159, on remote electronic devices, operatively associated with the dispensing machine 100, but independent from it, such as for example tablets, portable laptops, or smartphones used by the user.

In the following description, reference will be made to the elements of the operative representations referred to in FIGS. 5-12 with reference numbers corresponding to the analogous reference numbers used to indicate the respective components of the dispensing machine 100.

FIGS. 4a, 4b show a representation of two versions of containing units, as shown on the display device 159, to which the reference number 11 is given. In particular, FIG. 4a shows a containing unit 11 with a container 42 having a volume of capacity equal to, for example, 0.5 liter or 1 liter, while FIG. 4b shows a containing unit 11 with a container 42 having a volume of greater capacity, for example equal to 1 liter or 2 liters, respectively.

The various operating functions provided for in the control method according to the present invention are described in detail below, divided into paragraphs for clarity. Some of the operating functions described herein below are also schematically represented in FIGS. 13B and 14.

Machine Set-Up

The method may comprise an initial set-up step, which can comprise loading a list of all the containing units 11 received in the storage zone(s) 28 of the dispensing machine in said control unit or processor, each identified by a respective code. The list of the containing units can for example be provided by a user, e.g. via the input device, be generated by the computer system, or be retrieved from a database that is accessible to the control unit or processor by a suitable data transmission link. In the exemplary figures from 5 to 12, the code associated with the containing units is a three or four-digit numerical code, in which the first digit is always the number "4".

Moreover, in this step, it is also provided to load the complete list of formulations, or recipes, that can be dispensed by the dispensing machine, into the control unit or processor 164, combining—according to precise relative proportions—the fluid products contained in different containing units 11. The list of formulations or recipes can be retrieved from a formulation database accessible to the control unit or processor by a suitable data transmission link. The formulation database can be stored on local or on remote storage means, e.g. on a network data server. In FIG. 13A the data loading is schematically represented by the arrow F1, connecting an external computing system 161, provided with data storage means 162, with a processor 164, possibly integrated in the dispensing machine 100. In this figure, the computing system 161 is schematically represented, which can be remote from the dispensing machine 100 (as shown) or alternatively integrated inside it. The computing system 161 may comprise or be operatively linked to the processor 164, data storage means 162 with a formulation database, an input device 163, for example configured as a keyboard and a display device 159, which can be directly mounted to the dispensing machine 100 (as shown) or alternatively remote and therefrom but operatively connected with it. The present invention is however not limited to the configuration shown in FIG. 13A and foresees various other computer system and hardware configurations as described previously. Each of the computer system 161, the data storage means 162, the input device 163 and the display device 159 can be of the type disclosed above.

The user may then select a target formulation from the list of possible formulations that can be dispensed by the dispensing machine. An associated plurality of fluid products contained in respective containing units forming a sub-assembly of the entirety of available containing units, each to be delivered according to a predetermined quantity in order to obtain the target formulation, can accordingly be identified (see block 171 in FIG. 13B).

According to a version provided here, the data loading in the control unit can take place automatically because the control unit is configured to interact with the color management software developed by the supplier of the fluid coloring products. For example, the control and management unit can be appropriately interfaced with the color formulation management software called PAINTMANAGER® XI developed by PPG INDUSTRIES.

In this way, the data is transferred to the control unit of the dispensing machine automatically, quickly, and free from potential errors that can occur during data loading.

In another version, the data loading can take place manually. In this case, one operator may load all the data related to the list of the containing units and the fluid products contained therein.

In an alternative embodiment of the set-up step, the data is not loaded in the control unit 164 but, instead, it is provided a protected communication protocol between the control unit 164 and a remote data storage means 162 containing the formulation database.

The set-up step of the control method may comprise communicating to the control unit the exact expected positions of the containing units 111 in the dispensing machine 100, i.e. either in the dispensing zone 115 and in the storage zone(s) 128 (see block 170 in FIG. 13B). In this way, the method informs the user about the initial predetermined positions of all the containing units 111. In one example, the positions of the containing units is shown to the user on the display device 159 so that in this initial stage he can prepare the dispensing machine 100 by positioning each containing unit in the respective expected position.

Display of the Dispensing Machine

The control method then provides to graphically reproduce on the display device 159 the layout of the dispensing machine (see block 172 in FIG. 13B), with the representation of all the containing units 11 located in respective positions of the storage zone(s) 28, as shown in FIG. 5. In this drawing it is possible to see the representation of the dispensing zone 15, shown with a dotted line, which is shown with all thirteen positions provided in the support members 12 free, that is, without the containing units 11. In the representation of the dispensing zone 15 the receptacle 18 is also visible, resting on the support plane 17, integrated in the scale 16, which are disposed on the slider 20 sliding on the linear guides described previously. FIG. 5 also shows the representation of the protection elements 26 and of the sliding door 27, which allows or prevents the access of the operator to the removal position 24. The disposition of the containing units 11 in this drawing reflects the real location of the containing units 111 in the dispensing machine 100. In the representation shown by way of example in FIG. 5, the containing units 11 are disposed to form a row in the first modular element 34, above the dispensing zone 15, two rows in the second modular element 35, below the dispensing zone 15, and a plurality of rows, of a shorter length, in the third modular element 36.

In one version, the control method provides to make available to the user, for example on the display device 159, a representation of the layout of the dispensing machine, such as that shown in FIG. 5.

Afterward, the method may provide that the user visually verifies that the disposition of the containing units 11 in the representation on the display device 159 is actually corresponding to the actual position of the respective containing units 111 in the dispensing machine 100. If the user detects discrepancies between the representation of the layout of the machine on the display device 159, he/she can alternatively move the containing units 111 on the machine to the position shown on the display device 159, or—on the contrary—manually modify the disposition of the containing units 11 in the representation on the display device 159. In the latter case, the method according to the present invention can implement a "drag-and-drop" function known in the state of the art with a display of the touchscreen type, according to which the user can hold his/her finger pressed for a few seconds on the containing unit 11 to be moved, drag it into the new position (corresponding to the real one in the machine) and release it, as shown by way of example in FIG. 6.

In an alternative version, the control method may provide a hardware-implemented function to verify that the representation of the machine is consistent with the actual disposition of the dispensing machine 100. This verification function provides to detect, through one or more optical detection devices, for example one or more cameras of the type known in the state of the art, commonly used in controls for industrial applications, the position of the containing units 111 in the storage zones 128, and communication thereof to the control unit. For example, the optical detection devices can be attached to the frame 138 of the dispensing machine 100, in suitable positions so that their field of vision includes the storage zone(s) 128.

If there are discrepancies between what is detected by the optical detection devices and the representation of the layout of the machine on the display device 159, the control unit updates the disposition of the containing units 11 according to what has been detected.

In this version, the verification function can be activated by the user, for example by pressing a special key on the display device 159, in particular before the dispensing machine 100 starts operating. For example, the user can perform this verification function at the beginning of each working day, to verify that the representation of the machine shows a layout that reflects the actual disposition of the containing units 111 in the dispensing machine 100.

Furthermore, in the control method according to the present invention, a step can be provided to optimize the disposition of the containing units 111 in the dispensing machine 100 which can be activated by the user, for example by pressing a respective key of an input device or a respective icon in a graphical user interface, e.g. comprising the graphic representation of the layout of the machine, displayed on the display device 159. The optimization step may provide to calculate the consumption of the fluid products contained in all the containing units 111 received in the dispensing machine 100, in a determinate period of time, ordering them in a decreasing manner from the highest to the lowest.

The optimization step may also provide to divide the different storage zones 28 into two or more areas intended to receive fluid products having substantially the same (degree of) consumption. For example, a first zone can be defined by the storage zone 28 of the first modular element 34, a second area can be defined by the storage zone 28 of the second modular element 35, and a third area can be defined by the storage zone 28 of the third modular element 36. The optimization step can provide to highlight on the display device 159, showing the representation of the layout of the dispensing machine 100 for example as in FIG. 5, the products with the highest consumption so that they are all moved to said first area, which is more convenient for the user to access, since he/she can remove or store the containing units in this area without having to bend or move, since it is disposed immediately above the dispensing zone. Similarly, the optimization step can provide to highlight products with intermediate consumption (that are less consumed than the previous ones, but in any case, consumed rather frequently) so that they are all moved to said second area, and also highlight products with a low consumption (that is, those that are consumed only in low amounts) so that they are all moved to said third area.

The optimization step advantageously allows to dispose the containing units 111 in the dispenser machine 100 on the basis of the respective frequency of use and consumption, so that the most used units are all disposed in the most convenient positions accessible to the operator, so as to further reduce the time necessary to locate the containing units 111 in the dispensing zone 115, and likewise the times to remove them from the latter.

Management of the Dispensing Zone

When the user selects a particular formulation to be dispensed (see block 171 in FIG. 13B), the control method according to the present invention provides to highlight the containing units 11 necessary to obtain this formulation in the representation of the layout of the dispensing machine that the user is shown on the display device 159 (see block 173 in FIG. 13B). These containing units 11 can then be removed from their current position in the storage zone(s) 28, to be placed in the dispensing zone 15 for production of the target formulation.

Figure 7:
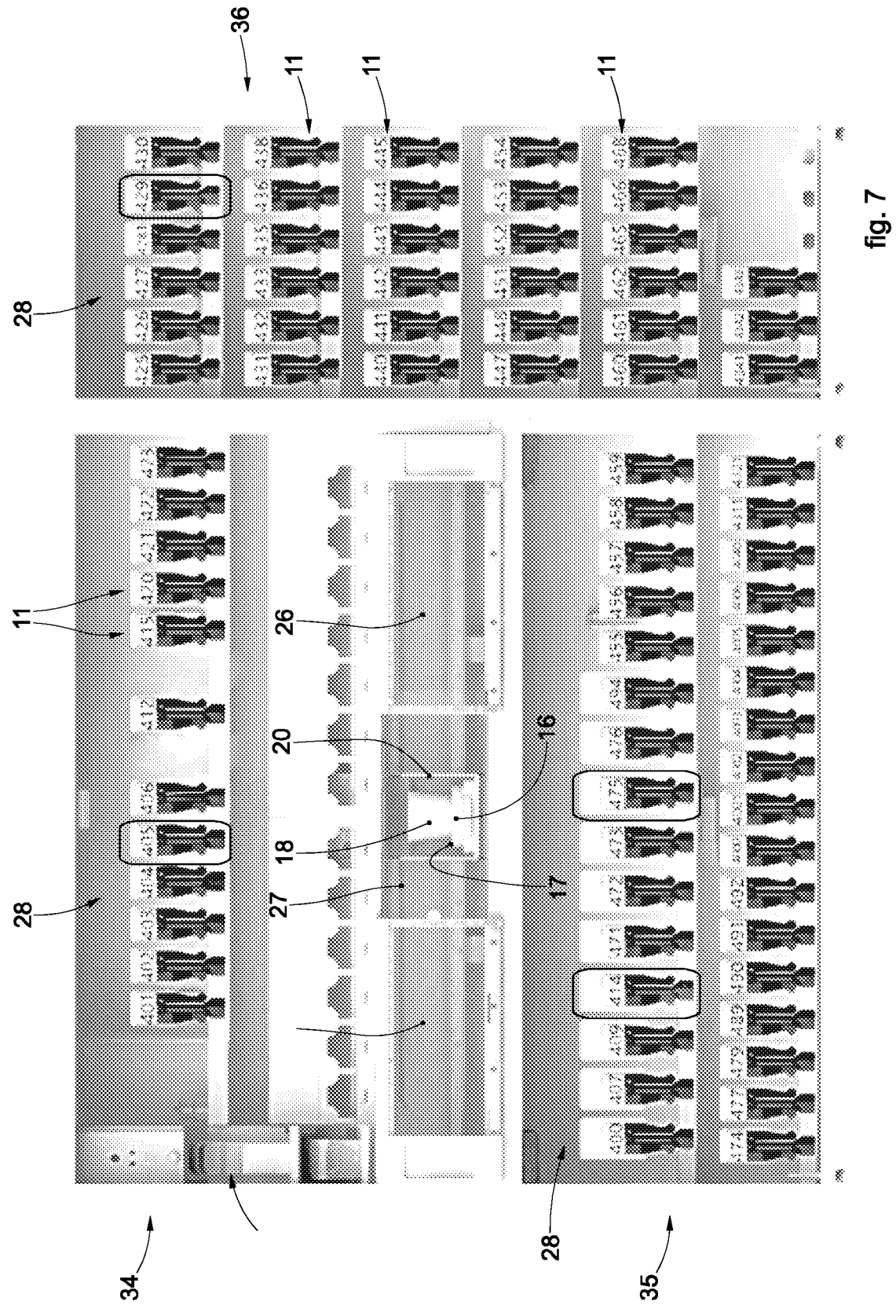

In a version given by way of example, shown in FIG. 7, the containing units 11 to be removed are surrounded by a rectangle, which can for example be colored or flashing intermittently. In this drawing, the containing units 11 identified by the codes "405", "429", "414" and "475" are highlighted by way of non-restrictive example.

Thanks to this, the user is guided, immediately and intuitively, by the representation on the display to displace the respective containing units 11 in the real dispensing machine, so that their displacement is quick and simple to carry out.

According to the present invention furthermore, light signaling means can optionally be provided, for example comprising one or more LED lights, associated with each position of the storage zone(s) 128. In this variant, while the display device 159 shows the representations of the containing units 11 which have to be removed, at the same time in the dispensing machine 100 the LEDS associated with the positions in which the containing units 111 to be removed are turned on.

Figures 8, 9:
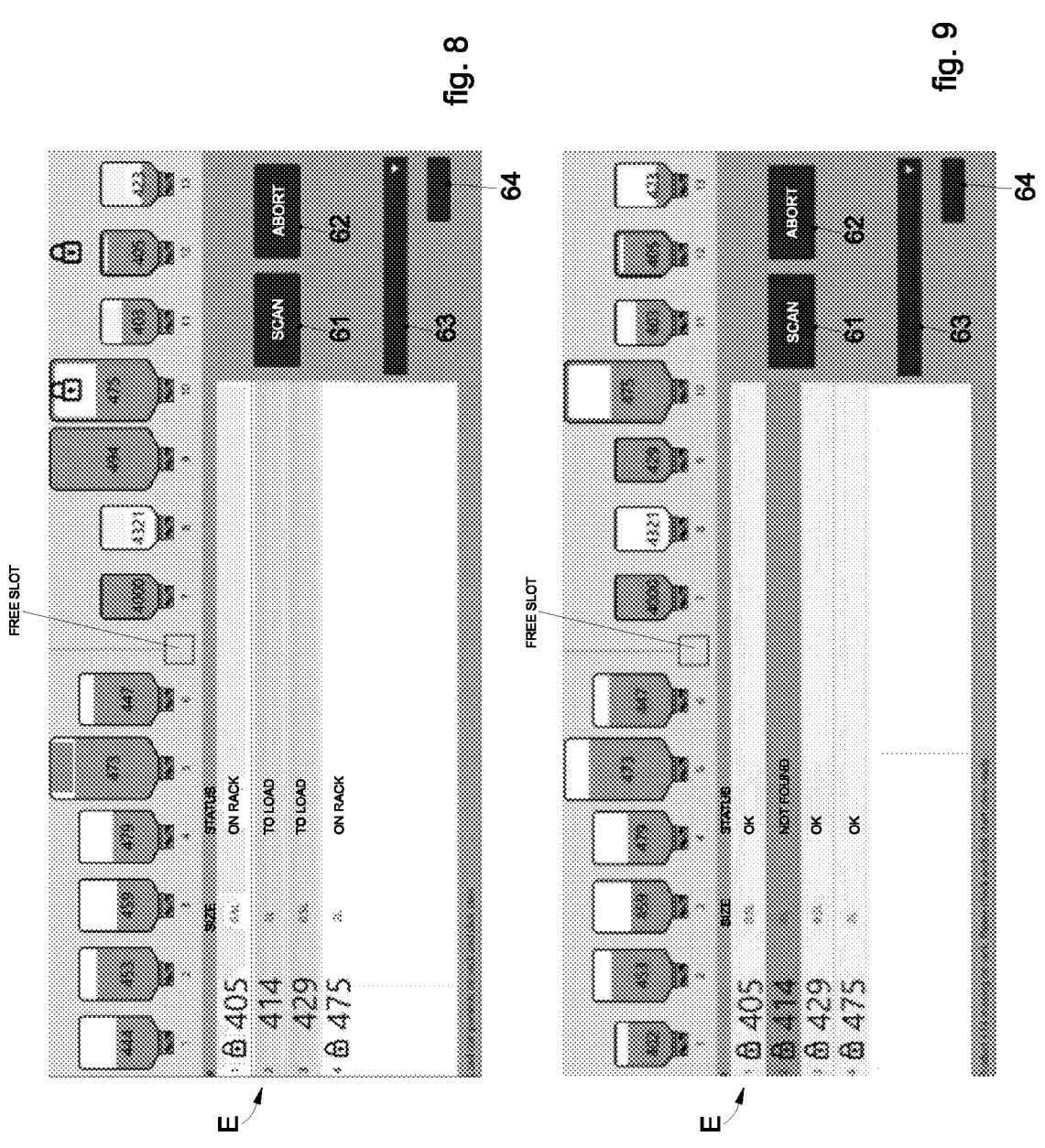
Figure 10:
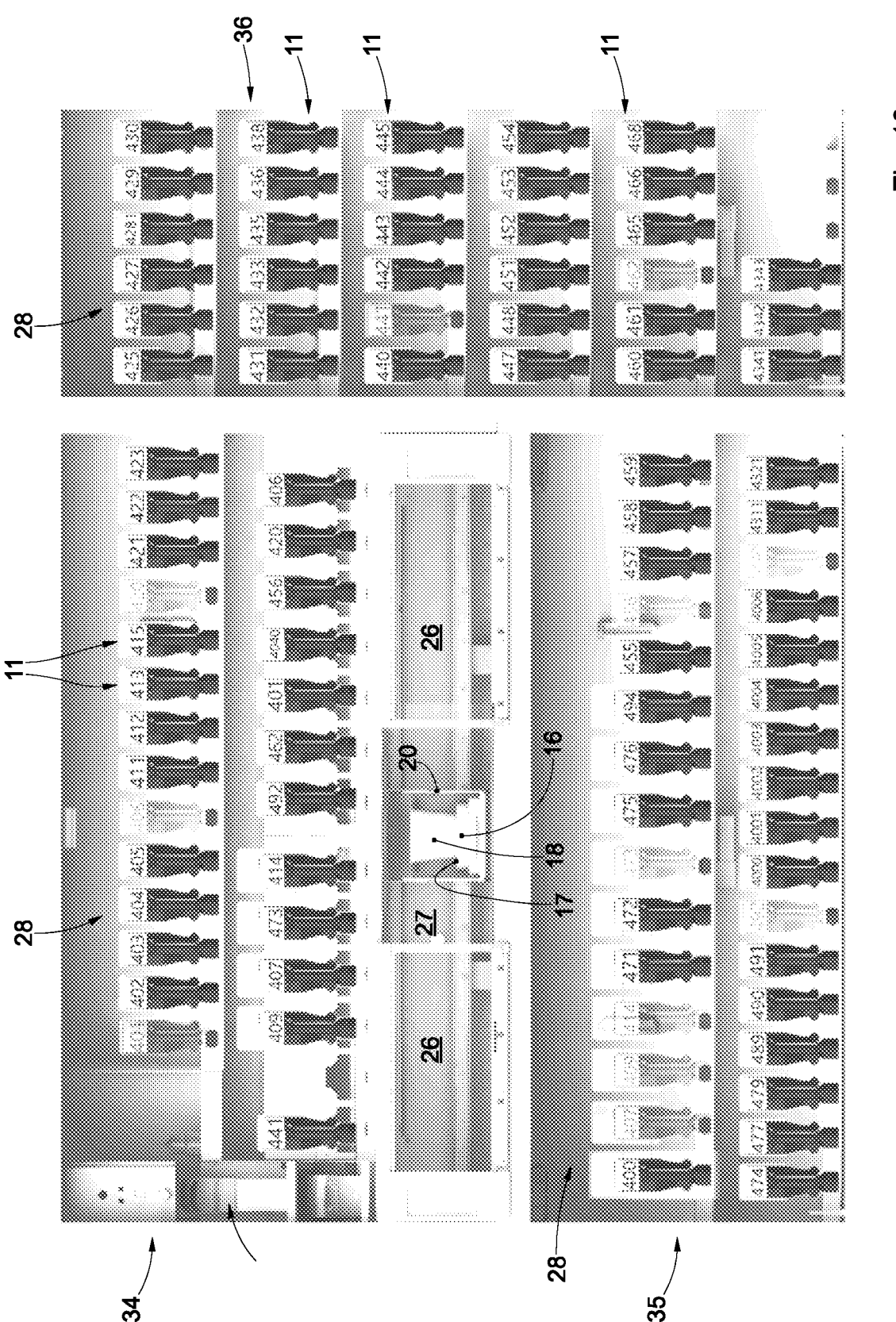

Subsequently, the control method according to the present invention may provide to display on the display device 159 a representation of the dispensing zone 15, and possibly the list of containing units 11 involved in the selected formulation. Examples of this type of displays are shown in FIGS. 8 and 9, which list the four containing units 11 identified by the codes listed above.

In the control method according to the present invention, the control unit can memorize, e.g. by keeping a history, the position of the containing units 11 on the support members 12 of the dispensing zone 15.

This means that the control method makes the dispensing machine 100 very flexible to use for users.

In a first mode of use, at the end of each dispensing cycle the user can remove the containing units 11 from the dispensing zone 15 to return them to their respective positions in the storage zones 28. In this case, the dispensing zone 15 is normally free of containing units 11, as shown in FIGS. 5 and 7.

According to the control method of the present invention it can provided for showing in the representation of the layout of the dispensing machine, in particular with a different graphic mode, the original position of the containing units 11 which are temporarily disposed on the support members 12 of the dispensing zone 15. In the example shown in FIG. 10, the containing units 11 temporarily located in the dispensing zone 15 are also shown, for example in transparency, in their original position inside the storage zones 28.

It is evident that this variant facilitates the user in the operations to remove the containing units 11 from the dispensing zone 15, since it guides him to return each containing unit 11 in its own position. This variant is particularly advantageous when the dispensing machine 100 is used according to the first mode of use described above, and simultaneously allows both to keep the dispensing zone 15 free, and also to maintain an ordered disposition of the containing units 11 in the storage zones. 28, so that each unit is located in the intended position.

In a second mode of use, it is not provided to systematically remove the containing units 11 from the dispensing zone 15 at the end of each dispensing cycle. In this mode of use, after selecting a new formulation to be dispensed, the user removes only some containing units 11 in order to dispose in the dispensing zone 15 the containing units 11 involved in the new formulation.

This method of use is particularly convenient when the formulations which are dispensed more frequently involve a certain number of fluid products, for example base products, which are common to the most recurrent formulations. In this way, the user avoids having to remove all the containing units 11 from the dispensing zone 15 because some of them can remain there as they are present in different formulations.

This second mode of use is reflected in the representations shown in FIGS. 8 and 9.

In these drawings, above the list of fluid products needed for the selected formulation, the containers 42 comprised in the respective containing units 11 are schematically shown, disposed on the support member 12 of the dispensing zone 15. The position of the containers, in positions numbered from "1" to "13" from left to right, reflects the actual position of the containing units 111 in the dispensing zone 115 of the dispensing machine 100.

As mentioned above, in accordance with the control method according to the present invention, the control unit can memorize, e.g. by keeping a history, the containing units disposed in the dispensing zone 15.

The control method then provides to verify whether one or more of the fluid products present in the list are contained in a containing unit 11 already present in the dispensing zone 15, for example left there at the end of previous dispensing cycles.

At the end of this verification, it is provided to graphically show on the display device 159 the containing units 11 already in position.

In the example shown, the containing units 11 identified by the codes "475" and "405" are already disposed in the dispensing zone 15.

The containing units 11 disposed in the dispensing zone 15 can be graphically highlighted, for example, by a thickening of the contour of the container 42, in particular with a colored or broken line, and/or by the association of a lock, which is indicative of the fact that these containing units 11 are already in position and do not need to be removed in order to free locations for the other fluid products comprised in the list below.

In one version, it is provided to graphically highlight the fluid products in the list, with which a lock can also be associated, together with a wording that informs the user that they are already disposed in position. In a variant, it is possible to graphically highlight, for example with a particular coloring, the lines of the list corresponding to the fluid products that remain to be located in the dispensing zone 15, possibly together with a wording that informs the user that those products are still to be positioned.

In the example shown, the user must therefore replace two containing units 11 present in the dispensing zone 15 with the two containing units 11 containing the fluid products identified by the codes "414" and "429".

The control method according to the present invention provides an optional step to verify the presence of all the containing units 11 needed to obtain the selected formulation, before starting the dispensing cycle.

The verification step can be started by the user, for example, by pressing on the display device 159 the "Scan" icon, indicated by the reference number 61 in FIGS. 8 and 9.

If the verification or scanning step is positive, the dispensing cycle can be started to obtain the selected formulation. Thanks to the verification step, the dispensing cycle can be performed effectively and quickly, without interruptions due to the lack of one of the ingredients necessary to complete the selected formulation.

The representation in FIG. 9 shows an example of a graphical user interface visible on the display device 159 if the verification step has a negative outcome. In this case, in fact, the control method detects the presence of only three fluid products, compared to the four required, and precisely the products identified by the codes "429", "475" and "405", while the product having code "414" is missing.

The method may provide to graphically highlight this condition to the user on the display device 159. By way of non-restrictive example, it can be provided both to highlight the fluid products present, for example by thickening the contour of the respective containers 42 and/or highlighting the corresponding lines of the list with a determinate coloring, and also to highlight the missing product, for example by coloring the corresponding line of the list with a bright color, together with a warning message for the user to inform him/her that this product was not found.

The verification or scanning step can for instance be performed by means of an optical reader, for example a barcode reader known in the state of the art, which is disposed on the slider 120 and is configured to detect an identification code (for example, a barcode) which is univocally associated with each containing unit 111. In one version, the verification or scanning step provides that the slider 120 carrying the optical reader slides along its guides in order to travel, parallel to the longitudinal direction X, the whole dispensing zone 115, for example starting from left to right, so as to detect the code associated with each containing unit 111 disposed in the thirteen positions available on the support members 112.

It should be noted that the representation of the dispensing zone 15 shown in FIGS. 8 and 9 also includes a "Cancel" icon to stop the operations in progress, indicated by the reference number 62, in the case where—for whatever reason—the selected formulation no longer has to be dispensed.

Furthermore, the representation of the dispensing zone 15 shown in FIGS. 8 and 9 also comprises the selection of the dispensing strategy or mode, which will be described in greater detail in the following paragraph, and which can be configured as a "drop-down" menu, indicated by the reference number 63.

Finally, the representation of the dispensing zone 15 shown in FIGS. 8 and 9 also includes an icon, indicated by the reference number 64, by means of which the user can return to the representation of the overall layout of the dispensing machine, for example as shown in FIGS. 5, 7 and 10-12.

Management of the Dispensing Step

The control method of the dispensing machine 100 is able to manage, for example, the dispensing of a quantity of a target formulation prepared starting from e.g. five or more different fluid products—as typically required for automotive finishing applications—in less than five minutes and with an accuracy of ±0.01 g per ingredient. Depending on the number of fluid products involved in the target formulation, the dispensing cycle can range from three to ten minutes, maintaining at the same the high dispensing accuracy desired, for example up to ±0.05 g per ingredient.

The control method according to the present invention may provide to keep memorized, e.g. by keeping a history, the quantities of fluid product contained inside each containing unit 111.

In one version, this quantity can be calculated knowing the specific weight of each individual fluid product. In this way, it is possible to subtract the quantity (by weight) of fluid product that has been delivered from the nominal quantity (by volume) contained in the container 142, making the weight-volume conversion by means of the (known) value of the specific weight.

According to some versions of the control method described here, it is provided to display, at least schematically, the degree of filling of the containers 42 comprised in the containing units 11 disposed in the dispensing zone 15, as shown in the representations shown by way of example in FIGS. 8 and 9.

The control method according to the present invention allows to predict the case in which the quantity of a certain fluid product to be delivered is less than the quantity of the same product contained inside the respective containing unit 111. In fact, since the control unit knows the quantity of product contained in the tank 142 of the containing unit 111, and also knows the quantity of that same product which has to be dispensed to obtain the target formulation selected, by calculating the difference between these two quantities it is possible to predict when the quantity available is not sufficient.

In this case, the control method according to the present invention advantageously allows the user to select the preferred dispensing strategy from several different dispensing modes available, for example by means of an aforementioned drop-down menu 63 as shown in FIGS. 8 and 9.

A possible first dispensing mode according to the method according to the present invention provides to follow the sequence of the formulation, dispensing the different fluid products according to the order of the list of ingredients of the respective target formulation. This is the "standard" mode that is proposed as a default, but that the user can still choose to modify, using the drop-down menu.

A second dispensing mode provides to dispense the fluid products following the order according to which the containing units are disposed on the rack. In other words, this mode provides following, during the dispensing cycle the sequence of the containing units, one after the other, from one end to the other end of the dispensing zone (for example from the left end to the right end, or vice versa). In some cases, this mode is advantageous since it allows to minimize the overall stroke of the slider 120 carrying the receptacle 118, thus reducing the overall duration of the dispensing cycle.

A third and a fourth dispensing mode respectively provides to dispense the fluid product/s, first or respectively last, for which the control method according to the present invention has verified that the quantity available is not sufficient to complete the target formulation. In this case, these dispensing modes are advantageous since they do not constrain the user to stay at the dispensing machine 100 for the whole duration of the dispensing cycle, in order to prevent, in his/her absence, the cycle from being interrupted because a fluid product is finished, as could happen following the first or second dispensing mode.

In fact, following the first or second dispensing mode, when the dispensing cycle starts to dispense the fluid product which is present in an insufficient quantity, the cycle is interrupted until the user returns, who will have to replace the finished tank 142 with a full new tank 142 in the containing unit 111 of the finished fluid product. It is obvious that this is disadvantageous because it significantly increases the dispensing times since the cycle can remain interrupted for a long time, during the user's absence.

Thanks to the flexibility of the control method according to the present invention, to overcome this disadvantage, when the control unit indicates on the display device 159 that one of the fluid products present in the dispensing zone is not sufficient to complete the target formulation selected, the user can select the third or fourth dispensing mode. In the first case, the depleted fluid product is dispensed first and the user, knowing this, can stay to watch over the dispensing machine 100 so as to replace the finished containing unit 111 with the new one containing the same fluid product. After this, the dispensing cycle continues automatically, without requiring the presence of the user, who can return after a few minutes to remove the receptacle 118 containing the target formulation selected. In the second case, on the other hand, the depleted fluid is dispensed last and then the user, as soon as the dispensing cycle has started, can move away from the dispensing machine 100 and when he/she returns, the target formulation has been substantially dispensed, with the exception of the missing quantity of the insufficient fluid product. In this way, as soon as the user returns to the dispensing machine 100, he/she replaces the finished containing unit 111 with the new one containing the same fluid product and immediately afterward the dispensing cycle can be completed.

In one version described here, the control method according to the present invention is also able to manage, integrally with the automatic dispensing cycle, the manual addition of one or more fluid products, typically at the end of the dispensing cycle when the receptacle 118 is still resting on the support plane 117 and the slider 120 has moved to the removal position 124. Said products can be, for example, additives or other similar substances contained in bottles or flasks housed in the auxiliary compartment 129.

If the target formulation selected requires the manual addition of one or more products, these products can be comprised in the product list comprised in the representation of the dispensing zone 15, possibly accompanied by a warning message that informs the user that this product must be delivered manually and must not be disposed on the support members 112 of the dispensing zone 115.

According to this version, the control method may provide to control, on the display device 159 and/or on a display associated with the scale 116, the quantity of product added manually, as the user gradually pours it into receptacle 118. This control is based on the detection of the scale 116, on which the receptacle remains resting even during the possible manual addition of said one or more products.

In another version of the control method according to the present invention, it is provided to fraction the dispensing of a fluid product, if the quantity to be dispensed exceeds the capacity of the scale 116, that is, the maximum value that can be measured by this measuring instrument. For example, the capacity of the scale 116 can be 2.2 kg. Since in the versions described here by way of example the maximum capacity of the tank 142 is 2 liters, certain fluid products having a high specific weight can weigh even more than the capacity of the scale. Consequently, some formulations can require a quantity of a certain fluid product, for example equal to 3 kg of product, which exceeds the capacity of the measuring instrument.

According to this version of the control method, it is provided to first verify whether each quantity of fluid product that is to be dispensed exceeds the capacity of the scale 116. In the event that the verification has a positive outcome, the control unit drives the dispensing unit 111 containing that particular fluid product so that this product is dispensed in two successive deliveries, in each of which, for example, half of the total quantity to be delivered is dispensed.

In the example described above, the fluid product is then for example delivered in two successive deliveries of 1.5 kg each.

Furthermore, according to the control method according to the present invention, before each dispensing cycle a preliminary step may be provided to verify the presence of the receptacle 118 on the support plane 117. This step can be carried out thanks to a presence sensor of the type known in the state of the art, integrated in the slider 120, and associated with the scale 116, which detects the presence, or absence/incorrect mounting, of the receptacle 118. If the presence sensor detects that the receptacle 118 is absent, the control method provides to prevent the start of the dispensing cycle and, at the same time, to send an alarm signal informing the user that the receptacle 118 is missing or incorrectly mounted. This preliminary verification step is advantageous since it prevents the dispensing machine 100 from being dirtied by the dispensing of fluid coloring products, in the event that the receptacle 118 is accidentally missing or incorrectly mounted.

The control method may also provide to verify that the sizes, in terms of capacity or volume, of the receptacle 118 are suitable to receive the quantity provided by the target formulation selected. According to this variant, the control unit has been provided, as input data, with the weight and volume of different receptacles 118 which can be used to receive the fluid products dispensed by the dispensing machine 100. In this way, while the sensor detects the presence of the receptacle 118, the scale 116 detect the weight thereof so that it can be detected if it is a receptacle 118 having a volume adequate to receive the target formulation selected.

Moreover, the control method according to the present invention may comprise, before each dispensing cycle a preliminary step, wherein it is verified if the door 127 giving access to the removal zone 124 is correctly closed so as to prevent the dispensing cycle to start if the door 127 is still open or is not correctly closed. This enhances the safety of the dispensing machine, which cannot operate if the door 127 is not close so as to avoid any possible accidental injuries to the operator hands.

According to the control method according to the present invention, it may further be provided for means to adjust the operating parameters of the dispensing machine 100 which control the dispensing cycle, such as for example the dispensing speed of the fluid product by the pumping unit 145 and/or the translation speed of the slider 120 carrying the scales 116 and the receptacle 118 and/or the maximum dispensing tolerance that is acceptable, possibly individually for each fluid product contained in respective containing units 111.

The adjustment of the parameters makes the dispensing machine 100 very flexible, which, depending on requirements, can operate in a more or less rapid manner and, consequently, more or less precisely. For example, if the dispensing machine is used to perform test dispensing cycles, the formulations of which are intended for test purposes, then the operating parameters of the machine can be varied in order to make it faster, at the expense of dispensing accuracy. In particular, a wider acceptable tolerance of a dispensed amounts allows the possibility to obtain quicker dispensing steps to reach the required quantity, to reduce the waiting time to stabilize the scale reading and to move faster the slider 120. By way of example, if a sensitivity of the scale 116 equal to 0.05 grams is accepted, instead of the sensitivity of 0.01 grams as described above, dispensing times can be reduced by about 10%, correspondingly increasing the speed of movement of the slider 120.

The control method can provide that the adjustment of the operating parameters can be performed via the display device 159, by means of an easy and intuitive interface to be used, but with protected access, for example by means of a password. In this way, it is possible to prevent the user from accidentally and inadvertently changing the operating parameters of the machine.

According to the control method according to the present invention, it may furthermore optionally be provided to associate visual signaling means, for example configured as one or more strips of LED lights, to the dispensing zone 115 to inform the user, possibly located distant from the dispensing machine, about the status of the dispensing cycle. In one exemplary variant, the control unit can command the strip/strips of LED lights to assume a blue color when the dispensing machine is performing a dispensing cycle, a green color when the cycle is terminated and the machine is ready to run a new cycle, and a red color if the cycle is interrupted because a problem or malfunction is detected. For example, it is provided that the strip/strips of LED lights turn red when the product contained in at least one of the containing units finishes during dispensing, without having reached the quantity that is expected to be dispensed.

In this version of the method, the control unit can also be configured to send a signal warning of the problem or malfunction to the user, for example by a text message or email on an electronic device supplied to the user, such as for example a mobile phone or a laptop, or an alert on a smart watch worn by the user.

Maintenance and Stock Management

Figure 11:
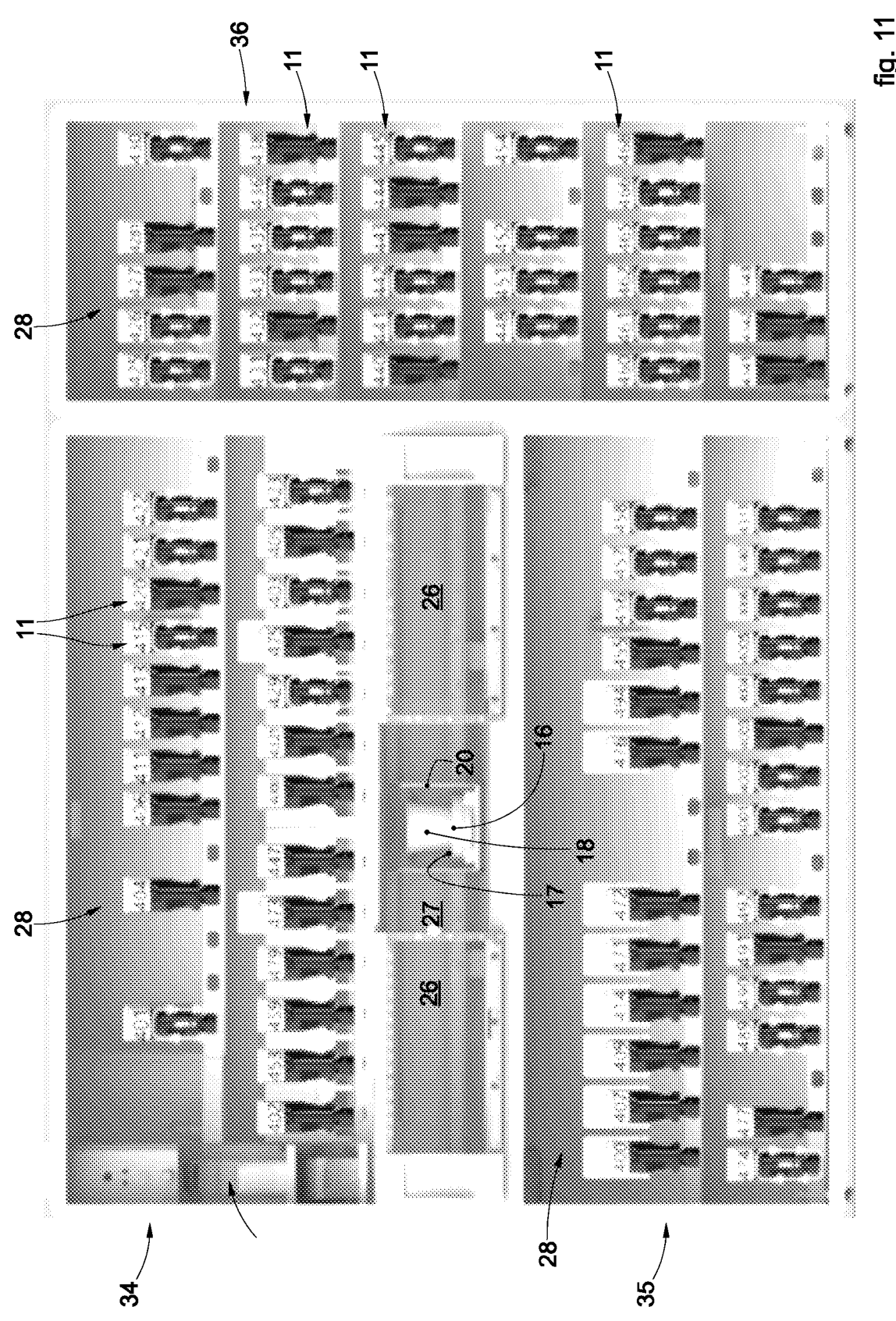

With reference to FIG. 11, we will now describe an optional function of the control method according to the present invention that allows to display the containing units 11, located both in the storage zones 28 and also in the dispensing zone 15, which have not been used for some time.

For example, the time elapsed since the last use can be set by the user, among the settings that allow to configure the method to control the dispensing machine. Alternatively, the control method according to the present invention can comprise storing for each containing unit the last use date in a dispensing cycle and calculation of the time that has elapsed since this last use date. For example, the time can be equal to one week, or two weeks, or one month, or more. The time elapsed since the last use is then compared to a predetermined time threshold.

According to this version, the control method provides to graphically highlight the containing units 11 which have not been used for a longer time than the one set by the user in the representation of the layout of the dispensing machine. For example, as shown in FIG. 11, these containing units 11 can be highlighted with an exclamation mark, combined with a closed ring on which one or more arrows are disposed.

The graphic highlighting of the containing units 11 not used for a longer time than the set time can optionally be requested by the user, by means of a special icon provided on the display device 159.

Thanks to this function, the control method allows the user to intuitively and quickly view all the containing units 11 that need to be recirculated to homogeneously mix the fluid product which, not having been used for some time, can dry up and at least partly clog the conduit assembly comprised in the containing unit 111.

The dispensing machine 100 provides the possibility of carrying out recirculation cycles of the fluid product contained in the container 142, suitably disposing the valves comprised in the containing unit 111. The fluid recirculation flow is obtained by means of the pumping unit 145, driven by the respective motor, disposed on the slider 120. As a consequence, the recirculation of the fluid product can be carried out, if necessary, in the dispensing zone 115.

According to the method of the present invention, once the containing units 11 that need to be recirculated are graphically highlighted, the user can proceed alternatively in the two following modes.

In a first mode, it can be provided to recirculate only the fluid products contained in the containing units 11 comprised in the target formulation to be delivered. In the example of FIG. 11, the dispensing zone 15 comprises three containing units 11 which need to be recirculated, that is, in particular the containing units identified by the codes "429", "403" and "423". If the target formulation to be delivered comprises one or more of these fluid products, before carrying out the dispensing cycle, the slider 120 is brought into correspondence with the containing unit 111 to be recirculated, and recirculates the fluid product, in the manner described above.

Alternatively, if circumstances allow it, the user can choose to periodically recirculate all the containing units 11 that need it, that is, for example all those shown graphically in FIG. 11. To do this, the control method according to the present invention provides that the user disposes, on the support member 112 of the dispensing zone 115, in all thirteen available positions, an equal number of containing units 111 that have to be recirculated.

In this way, it is possible to start one or more cycles of exclusive recirculation, in which the slider 120 is disposed in correspondence with each containing unit 111 disposed on the support member 112, to recirculate them all, one after the other, in groups of thirteen at a time.

This variant is advantageous since it allows to shorten the duration of the dispensing cycles, which do not comprise the step of recirculating the products contained in one or more containing units 111, if the recirculation operation is performed periodically at regular time intervals, as described above.

According to the control method described here, it can also be provided for that the user can select a particular containing unit 11 from the display device 159, for example by keeping the corresponding graphic symbol pressed for a few seconds. In the example shown in FIG. 12, after the user has selected the containing unit identified by the code "421", a dialogue window is opened, indicated by the number 65 in the drawing, comprising a field that can be modified by the user, indicated by the number 66, relating to the quantity of fluid product present in the containing unit 111.

This allows the user to verify that the quantity of fluid product indicated on the display device 159 is actually that contained in the containing unit, and possibly to modify it in the field 66 to adapt it to the real quantity. In order to carry out this verification, the user can remove the containing unit 111 to be controlled and dispose it on the scale 116 comprised in the dispensing machine 100. Since the control unit of the machine knows both the tare of the containing units 111 and also the specific weight of the fluid product contained therein, thanks to the value read on the scale 116, it is possible to directly calculate the volume of fluid present inside the containing unit 111 in question. Consequently, if this value does not coincide with the one shown in the field 66, then the user will modify it according to what is detected by the scale 116.

Thanks to this function, the control method is particularly flexible since it allows to verify, for example by sampling, whether the fluid product contained in the containing unit 111 is the one indicated on the display device 159 and/or to manually adjust this quantity.

If, for example, the user has removed a certain quantity of fluid product from one of the containing units 111 to deliver it outside the machine, the control unit naturally cannot take into account this manual delivery outside the machine. Therefore, thanks to the flexibility of the method, it is possible to manually set the residual quantity of fluid product, also following a manual delivery outside the machine.

Moreover, this possibility of manually adjusting the quantity of fluid product contained in a containing unit 111 makes the use of the dispensing machine 100 very flexible since the user can also choose to prematurely replace the container 142 containing a minimum residual quantity of fluid product with a new container 142, completely filled with the fluid product. In this way, the user avoids having to make the replacement during the first dispensing cycle involving that particular fluid product, when in all likelihood the residual quantity of product will not be sufficient to guarantee the dispensing of the necessary quantity.

According to a variant, not shown, the control method described here also provides a function to manage a prior replacement for the containing units 111 having containers 142 near to finishing. In this variant, by pushing a dedicated icon on the display device 159, the user can obtain a graphic display—in the context of the layout of the machine—of all the containing units 11 containing a quantity of fluid product lower than a pre-set threshold value. For example, this variant can provide to graphically highlight all the containing units 11 in which there is a residual quantity of fluid product lower than 0.1 cc. In one embodiment, the containing units can be graphically highlighted by graphic lines or symbols, broken and/or colored and/or flashing, which can be disposed above or around the containing units 11 that have to be highlighted. Thanks to the prior replacement function described above, the user can replace the containers 142 of the containing units 111 shown on the screen, with respective new containers, completely filled with the same fluid product.

Subsequently, the user will manually set, by means of the dialog window 65, the correct quantity of fluid product contained in the containing units in which the container has been replaced. In particular, the user will select, in the representation of the layout of the dispensing machine, one at a time, the containing units 11 in which the finished container has been replaced with a new one, and will set in the field 66 the quantity of fluid product present, equal to the nominal one, that is, for example equal to 0.5 liters, or to 1 liter, or to 2 liters, depending on the nominal capacity of the container replaced.

Furthermore, according to the control method described here, a function can be provided to add a containing unit to the dispensing machine 100. This function is particularly useful when the formulations that can be delivered by the machine contain a new color released by the manufacturer of the fluid coloring products. In this case, it is possible to instruct the control unit about the presence of the new product, for which it is possible to suggest a certain position in the storage zones 128 of the dispensing machine 100. The updating of the color management software will thus provide to integrate the new formulations comprising this new product, among the target formulations that can be selected.

Figure 12:

It is understood that in the various versions described above, the graphic highlighting of one or more containing units can involve both the representation of the layout of the dispensing machine, such as for example that in FIGS. 11 and 12, and also the schematic representation of the dispensing zone, such as for example that referred to in FIGS. 8 and 9.

It is clear that modifications and/or additions of parts and components, or steps or sub-steps, can be made to the dispensing machine and its control method as described heretofore, without departing from the field and scope of the present invention.

Although the present invention has been described with reference to some specific examples, a person of skill in the art shall certainly be able to achieve many other equivalent forms of machine or method to prepare a target formulation defined by the user, starting from a plurality of fluid products, having the characteristics as set forth in the claims and hence all coming within the field of protection defined thereby.

We claim:

1. A computer-implemented method to control a dispensing machine configured to deliver fluid products inside a receptacle and comprising a plurality of containing units, each containing a respective fluid product and a pumping unit, wherein the pumping unit is driven by a motor external to the containing units, one or more storage zones of said containing units and a dispensing zone in which it is provided to locate, temporarily and selectively, a sub-assembly of said containing units containing the fluid products to be delivered in a dispensing cycle, wherein on each occasion when a containing unit of the sub-assembly is to deliver the fluid product, the motor is operatively associated with the pumping unit of the containing unit that is to deliver the fluid product, making use of a computing device comprising at least one processor, data storage means with a formulation database, an input device, and a display device, wherein the control method comprises:

> determining the disposition of the plurality of containing units in said dispensing zone and in said storage zone(s), > receiving, via the input device or via the display device, a target formulation, selected by the user, and identifying, via the processor, from the formulation database an associated plurality of fluid products contained in respective containing units of said sub-assembly, each to be delivered according to a predetermined quantity in order to obtain said target formulation;

> displaying, on the display device, a graphic representation of the layout of the dispensing machine with said dispensing zone and said storage zone(s), which respectively reflects the determined disposition of said plurality of containing units in said dispensing zone and in said storage zone(s); and > graphically highlighting, via the processor, in said graphic representation, at least said sub-assembly of containing units from which the selected target formulation is to be produced by means of signaling means so as to facilitate their identification by the user and thus provide guidance to the user for displacing of one or more than one containing unit(s) from the storage zone(s) to the dispensing zone, or vice versa, if required for the production of the target formulation.

2. The computer-implemented control method as in claim 1, wherein said signaling means comprise lines or graphic symbols, such as for example arrows or exclamation marks, said arrows or exclamation marks formed by dashes and/or colored and/or flashing dots, which can be disposed above or around the containing units comprised in said sub-assembly of containing units from which the selected target formulation is to be produced disposed in said dispensing zone and/or in said storage zone(s).

3. The computer-implemented control method as in claim 1, further comprising displaying, on the display device, a list of codes, for example numerical or alphanumeric, each univocally associated with a respective fluid product contained in said sub-assembly of said containing units, optionally combined with the graphic representation of the layout of said dispensing zone, and wherein said graphic highlighting comprises highlighting, via the processor, one or more lines of said list of codes with a particular coloring, possibly intermittently flashing, and/or graphically highlighting via the processor, the corresponding containing unit, corresponding to the fluid product shown in the list, also in the graphic representation of the layout of said dispensing zone by means of said signaling means; said graphic highlighting of said one or more rows and of said containing unit indicating the presence or absence of the containing unit comprising said fluid product in said dispensing zone or the fact that the quantity of fluid product present in said containing unit is not sufficient to complete the dispensing cycle to obtain the target formulation selected.

4. The computer-implemented control method as in claim 1, further comprising scanning, prior to initiating the dispensing cycle, the containing units located in said dispensing zone, in particular by means of optical detection means suitable to read a code, for example a bar code, associated with each of said containing units to verify which containing units are located in said dispensing zone, and wherein the method comprises displaying the results of the scan on the display device.

5. The computer-implemented control method as in claim 3, wherein the displaying of the results of the scan provides associating an indicator with the lines of said list of codes with information about the presence or absence of the corresponding containing unit in the dispensing zone and/or optionally to associate lines or graphic symbols to the corresponding containing unit whose presence has been verified, in the graphic representation of the layout of said dispensing zone.

6. The computer-implemented control method as in claim 1, further comprising keeping record of the quantity of residual fluid product contained inside a container of known nominal capacity comprised by each containing unit, calculating, via the processor, the quantity of residual fluid product contained in a container comprised in said containing unit as the difference between the quantity contained in the container before the dispensing cycle, and the quantity delivered in said dispensing cycle.

7. The computer-implemented control method as in claim 6, further comprising displaying, on the display device, in the graphic representation of the layout of the dispensing machine in a schematic manner, the quantity of residual fluid product inside the respective container, at least for each of the containing units comprised in said sub-assembly.

8. The computer-implemented control method as in claim 6, further comprising setting, via the input device, a lower limit threshold value of the quantity of residual fluid product contained in said container, and optionally graphically highlighting in said graphic representation of the layout of the dispensing machine, in particular in the graphic representations of said dispensing zone and/or of said storage zone(s), the containing units in which there is a quantity of residual fluid product which is lower than said lower limit threshold value.

9. The computer-implemented control method as in claim 8, further comprising, before each dispensing cycle, selecting, via the input device, a dispensing mode by the user, wherein the dispensing mode can be selected from a mode that provides for a sequential dispensing of the fluid products, according to the order provided in the list of products memorized in the target formulation, or according to the order by which the containing units of said sub-assembly are placed in said dispensing zone, or a mode that provides for dispensing first or last the fluid product(s) to be dispensed contained in the containing unit(s) in which there is a quantity of residual fluid product which is lower than said lower limit threshold value.

10. The computer-implemented control method as in claim 1, wherein the position of the containing units in the representation of the layout of the storage zone(s) and/or of the dispensing zone of said dispensing machine, is modifiable by selecting, one at a time, the containing unit to be moved and by dragging it to a new position.

11. The computer-implemented control method as in claim 7, wherein the representation of the layout of the storage zones and/or of the dispensing zone of said dispensing machine, comprises means, such as a dialog window, to modify manually the quantity of residual fluid product contained inside the container comprised in the containing unit, via the input device, to set a new updated value, in particular expressed in volume, of the quantity of residual fluid product.

12. The computer-implemented control method as in claim 11, wherein said new updated value is obtained by the user using a scale provided in said dispensing machine and weighing on it one containing unit at a time; taking into account the known tare of said containing unit and the specific weight of the fluid product contained therein.

13. The computer-implemented control method as in claim 1, further comprising storing for each containing unit the last use date in a dispensing cycle, comparing, via the processor, the time that has elapsed since said last use date with a predetermined time threshold, in particular expressed in days or weeks, and subjecting the containing unit(s) for which the comparison reveals that the time elapsed since the date of last use is longer than said predetermined time threshold to an internal recirculation operation of the fluid product contained therein, when said containing unit(s) is/are disposed in said dispensing zone, before the next dispensing cycle in which the fluid product contained therein is to be delivered.

14. The computer-implemented control method as in claim 13, further comprising graphically highlighting, by means of said signaling means, in said graphic representation of the layout of the dispensing machine, in particular in the graphic representations of said dispensing zone and/or of said storage zone(s), the containing units which have been identified as units to be recirculated.

15. The computer-implemented control method as in claim 1, wherein the display device is a touchscreen associated with said dispensing machine, or a remote electronic device accessible to the user, operatively associated with the dispensing machine, but independent from it, such as a tablet, laptop, or smartphone.

16. The computer-implemented control method as in claim 1, further comprising informing the user, possibly positioned at a distance from the dispensing machine, about the state of the dispensing cycle of the machine by means of visual signaling means, for example configured as one or more led lights associated with said dispensing zone and suitable to assume different colors for the different operating steps of the dispensing machine.

17. The computer-implemented control method as in claim 1, further comprising sending, via the processor, a warning signal to the user to inform him/her of a problem or malfunctioning of the dispensing machine, for example by means of a text message or email on an electronic device supplied to the user or an alert on a smart watch worn by the user.

18. The computer-implemented control method as in claim 1, further comprising checking, via the processor, before each dispensing cycle, by means of a presence sensor in communication with the computer device whether the receptacle is present and correctly mounted in the dispensing machine and preventing in the event that the presence sensor detects that the receptacle is absent or incorrectly mounted, the dispensing cycle from starting and sending an alarm signal that informs the user that said receptacle is missing or incorrectly mounted.

19. The computer-implemented control method as in claim 1, further comprising adjusting, via the input device, one or more operating parameters of the dispensing machine which control the dispensing cycle, in particular the dispensing speed of the fluid product by a pumping unit which drives the flow of fluid product and/or the translation speed of a slider on which a scale is disposed, provided with a support plane for said receptacle and/or the maximum dispensing tolerance that is acceptable, possibly individually for each fluid product contained in respective containing units.

20. The computer-implemented control method as in claim 1, further comprising a step to optimize the disposition of the containing units in the dispensing machine comprising calculating, via the processor, the consumption of the fluid products contained in all the containing units received in the dispensing machine, in a determinate period of time, ordering them in descending order from the highest to the lowest so as to suggest to the user, via the display device, an optimized disposition of the containing units in which those with the highest consumption are disposed in areas of the storage zone(s) adjacent or closest to said dispensing zone, while those with a lower consumption are disposed in areas of the storage zone(s) farther away from said dispensing zone.

21. A dispensing machine configured to deliver fluid products inside a receptacle and comprising a plurality of containing units, each containing a respective fluid product, one or more storage zones of said containing units, a dispensing zone in which a sub-assembly of said containing units containing the fluid products to be delivered in a dispensing cycle is temporarily and selectively located, and a slider on which a scale is disposed, provided with a support plane for said receptacle and mobile on linear guides so as to slide parallel to a longitudinal direction so that said slider, together with said scales and said receptacle, can move below said sub-assembly of containing units, wherein the dispensing machine also comprises a programmable control unit configured to implement a control method as in claim 1, and a display, for example a touchscreen, which defines interface means by means of which the operator can control the functioning of the dispensing machine and display the graphic representation thereof.

22. A computer-readable medium containing executable program code for configuring a programmable processor or control unit comprised by or operatively linked to a dispensing machine, such as a dispensing machine according to claim 21, to carry out the computer-implemented method according to claim 1.

23. A computer-implemented method to control a dispensing machine configured to deliver fluid products inside a receptacle and comprising a plurality of containing units, to a new position and each containing a respective fluid product, one or more storage zones of said containing units and a dispensing zone in which it is provided to locate, temporarily and selectively, a sub-assembly of said containing units containing the fluid products to be delivered in a dispensing cycle, making use of a computing device comprising at least one processor, data storage means with a formulation database, an input device, and a display device, wherein the control method comprises:

determining the disposition of the plurality of containing units in said dispensing zone and in said storage zone(s);

receiving, via the input device or via the display device, a target formulation, selected by the user, and identifying, via the processor, from the formulation database an associated plurality of fluid products contained in respective containing units of said sub-assembly, each to be delivered according to a predetermined quantity in order to obtain said target formulation;

displaying, on the display device, a graphic representation of the layout of the dispensing machine with said dispensing zone and said storage zone(s), which respectively reflects the determined disposition of said plurality of containing units in said dispensing zone and in said storage zone(s); and graphically highlighting, via the processor, in said graphic representation, at least said sub-assembly of containing units from which the selected target formulation is to be produced by means of signaling means so as to facilitate their identification by the user and thus provide guidance to the user for displacing of one or more than one containing unit(s) from the storage zone(s) to the dispensing zone, or vice versa, if required for the production of the target formulation, wherein the position of the containing units in the representation of the layout of the storage zone(s) and/or of the dispensing zone of said dispensing machine, is modifiable by selecting, one at a time, the containing unit to be moved and by dragging it to a new position.

24. A computer-implemented method to control a dispensing machine configured to deliver fluid products inside a receptacle and comprising a plurality of containing units, each containing a respective fluid product, one or more storage zones of said containing units and a dispensing zone in which it is provided to locate, temporarily and selectively, a sub-assembly of said containing units containing the fluid products to be delivered in a dispensing cycle, making use of a computing device comprising at least one processor, data storage means with a formulation database, an input device, and a display device, wherein the control method comprises:

determining the disposition of the plurality of containing units in said dispensing zone and in said storage zone(s);

receiving, via the input device or via the display device, a target formulation, selected by the user, and identifying, via the processor, from the formulation database an associated plurality of fluid products contained in respective containing units of said sub-assembly, each to be delivered according to a predetermined quantity in order to obtain said target formulation;

displaying, on the display device, a graphic representation of the layout of the dispensing machine with said dispensing zone and said storage zone(s), which respectively reflects the determined disposition of said plurality of containing units in said dispensing zone and in said storage zone(s);

graphically highlighting, via the processor, in said graphic representation, at least said sub-assembly of containing units from which the selected target formulation is to be produced by means of signaling means so as to facilitate their identification by the user and thus provide guidance to the user for displacing of one or more than one containing unit(s) from the storage zone(s) to the dispensing zone, or vice versa, if required for the production of the target formulation; and checking, via the processor, before each dispensing cycle, by means of a presence sensor in communication with the computer device whether the receptacle is present and correctly mounted in the dispensing machine and preventing in the event that the presence sensor detects that the receptacle is absent or incorrectly mounted, the dispensing cycle from starting and sending an alarm signal that informs the user that said receptacle is missing or incorrectly mounted.

25. A computer-implemented method to control a dispensing machine configured to deliver fluid products inside a receptacle and comprising a plurality of containing units, each containing a respective fluid product, one or more storage zones of said containing units and a dispensing zone in which it is provided to locate, temporarily and selectively, a sub-assembly of said containing units containing the fluid products to be delivered in a dispensing cycle, making use of a computing device comprising at least one processor, data storage means with a formulation database, an input device, and a display device, wherein the control method comprises:

determining the disposition of the plurality of containing units in said dispensing zone and in said storage zone(s);

receiving, via the input device or via the display device, a target formulation, selected by the user, and identifying, via the processor, from the formulation database an associated plurality of fluid products contained in respective containing units of said sub-assembly, each to be delivered according to a predetermined quantity in order to obtain said target formulation;

displaying, on the display device, a graphic representation of the layout of the dispensing machine with said dispensing zone and said storage zone(s), which respectively reflects the determined disposition of said plurality of containing units in said dispensing zone and in said storage zone(s);

graphically highlighting, via the processor, in said graphic representation, at least said sub-assembly of containing units from which the selected target formulation is to be produced by means of signaling means so as to facilitate their identification by the user and thus provide guidance to the user for displacing of one or more than one containing unit(s) from the storage zone(s) to the dispensing zone, or vice versa, if required for the production of the target formulation; and adjusting, via the input device, one or more operating parameters of the dispensing machine which control the dispensing cycle, in particular the dispensing speed of the fluid product by a pumping unit which drives the flow of fluid product and/or the translation speed of a slider on which a scale is disposed, provided with a support plane for said receptacle and/or the maximum dispensing tolerance that is acceptable, possibly individually for each fluid product contained in respective containing units.

* * * * *